(12) United States Patent
Kim et al.

(10) Patent No.: US 10,460,780 B2
(45) Date of Patent: Oct. 29, 2019

(54) MAGNETO-RESISTIVE RANDOM ACCESS MEMORY (MRAM) EMPLOYING AN INTEGRATED PHYSICALLY UNCLONABLE FUNCTION (PUF) MEMORY

(71) Applicant: QUALCOMM Incorporated, San Diego, CA (US)

(72) Inventors: Sungryul Kim, San Diego, CA (US); Chando Park, Palo Alto, CA (US); Seung Hyuk Kang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/939,923

(22) Filed: Mar. 29, 2018

(65) Prior Publication Data
US 2019/0304527 A1    Oct. 3, 2019

(51) Int. Cl.
| G11C 11/16 | (2006.01) |
| H04L 9/32 | (2006.01) |
| H01L 43/08 | (2006.01) |
| H01L 27/22 | (2006.01) |

(52) U.S. Cl.
CPC ........ *G11C 11/1655* (2013.01); *G11C 11/161* (2013.01); *G11C 11/1657* (2013.01); *G11C 11/1659* (2013.01); *G11C 11/1673* (2013.01); *G11C 11/1675* (2013.01); *H01L 27/226* (2013.01); *H01L 43/08* (2013.01); *H04L 9/3278* (2013.01)

(58) Field of Classification Search
CPC .............. G11C 11/1655; G11C 11/161; G11C 11/1657; G11C 11/1659

USPC ........................................................ 365/158
See application file for complete search history.

(56) References Cited

U.S. PATENT DOCUMENTS

| 9,230,630 | B2 | 1/2016 | Zhu et al. |
| 9,712,330 | B2 | 7/2017 | Smith |
| 2017/0048072 | A1 | 2/2017 | Cambou |
| 2017/0214532 | A1 | 7/2017 | Das et al. |

(Continued)

OTHER PUBLICATIONS

Zhang, LE et al., "Highly Reliable Memory-based Physical Unclonable Function Using Spin-Transfer Torque MRAM," 2014 IEEE International Symposium on Circuits and Systems (ISCAS), 2014, IEEE, 4 pages.

*Primary Examiner* — Anthan Tran
(74) *Attorney, Agent, or Firm* — W&T/Qualcomm

(57) ABSTRACT

Magneto-resistive random access memory (MRAM) employing an integrated physically unclonable function (PUF) memory. The MRAM includes an MRAM array comprising an MRAM data array of data MRAM bit cells and an MRAM PUF array comprising PUF MRAM bit cells to form an integrated MRAM PUF array in the MRAM array. A resistance sensed from the PUF MRAM bit cells is compared to a reference resistance between the reference MRAM bit cells in the accessed MRAM bit cell row circuit in response to a read operation to cancel or mitigate the effect of process variations on MRAM bit cell resistance. The difference in sensed resistance and reference resistance is used to generate a random PUF output. By integrating the MRAM PUF array into an MRAM array containing an MRAM data array, access circuitry can be shared to control access to the MRAM data array and MRAM PUF, thus saving memory area.

21 Claims, 9 Drawing Sheets

(56) References Cited

U.S. PATENT DOCUMENTS

2017/0365316 A1\* 12/2017 Wang .................. G11C 11/1675
2018/0091300 A1\* 3/2018 Tomishima ........... G11C 11/161

\* cited by examiner

MAGNETO-RESISTIVE RANDOM ACCESS MEMORY (MRAM) EMPLOYING AN INTEGRATED PHYSICALLY UNCLONABLE FUNCTION (PUF) MEMORY

BACKGROUND

I. Field of the Disclosure

The technology of the disclosure relates generally to physically unclonable functions (PUFs), and more particularly to PUF cells employing a magnetic tunnel junction (MTJ) for generating a random output as a function of MTJ resistance.

II. Background

A physical unclonable function (PUF) (also called a physically unclonable function (PUF)) is a physical entity that is embodied in a physical structure, and is easy to evaluate but hard to predict. PUFs depend on the uniqueness of their physical microstructure. This microstructure depends on random physical factors introduced during manufacturing. For example, in the context of integrated circuits (ICs), an on-chip PUF is a chip-unique challenge-response mechanism exploiting manufacturing process variations inside the ICs. These manufacturing process variations are unpredictable and uncontrollable, which makes it virtually impossible to duplicate or clone the structure. When a stimulus is applied to a PUF cell, the PUF cell reacts and generates a response in an unpredictable but repeatable way due to the complex interaction of the stimulus with the physical microstructure of the IC employing the PUF cell. This exact microstructure of the IC depends on physical factors introduced during its manufacture, which are unpredictable. The applied stimulus is called the "challenge," and the reaction of the PUF cell is called the "response." A specific challenge and its corresponding response together form a challenge-response pair (CRP) or challenge-response behavior. The PUF's "unclonability" means that each IC employing the PUF cell has a unique and unpredictable way of mapping challenges to responses, even if one IC is manufactured with the same process as another seemingly identical IC. Thus, it is practically infeasible to construct a PUF cell with the same challenge-response behavior as another IC's PUF cell, because exact control over the manufacturing process is infeasible.

Because it is practically infeasible to construct a PUF cell with the same challenge-response behavior as another PUF cell, a PUF cell can be included in an IC to generate unique, random information based on the underlying physical characteristics of a device. For example, information generated by the PUF cell may be used to authenticate a device or may be used as a cryptographic key. As another example, a mobile device may include circuitry that is configured to generate a PUF output for use as a basis for a device identifier of the device. The device identifier may be used as part of an authentication process with a server that is programmed with the device identifier.

PUF cells can be implemented in several different technologies. As an example, a PUF cell can be provided in the form of a static random access memory (SRAM) cell. For example, FIG. 1 illustrates an SRAM PUF cell 100 in the form of an SRAM bit cell 102. As shown therein, the SRAM PUF cell 100 is comprised of two cross-coupled inverters 104(1), 104(2). Each inverter 104(1), 104(2) includes a pull-up P-type Field-Effect Transistor (FET) (PFET) 106P(1), 106P(2) coupled to a positive voltage rail 108P having a positive supply voltage $V_{DD}$, and a pull-down N-type FET (NFET) 106N(1), 106N(2) coupled to a negative voltage rail 108N having a negative supply voltage $V_{SS}$. The cross-coupled inverters 104(1), 104(2) reinforce each other to retain data in the form of a voltage on a respective true storage node T and a complement storage node C. In a read operation, a bit line BL and a complement bit line BLB are pre-charged to the positive supply voltage $V_{DD}$. Then, a word line WL coupled to gates G of the access transistors 110(1), 110(2) is asserted to evaluate the differential voltages on the true storage node T and complement storage node C to read the SRAM bit cell 102. If the SRAM bit cell 102 has not been previously written, the initial state of the SRAM bit cell 102 is determined by process variation of the pull-up PFETs 106P(1), 106P(2) and the pull-down NFETs 106N(1), 106N(2) when the word line WL is asserted to activate the access transistors 110(1), 110(2) (their gate-to-source voltage exceeding their threshold voltage $V_{TH}$). Thus, the SRAM bit cell 102 can be used to generate a random PUF output. Either the true storage node T or complement storage node C can be used as the random PUF output. The voltage state ($V_{DD}$ or $V_{SS}$) on the true storage node T will eventually settle to be the opposite voltage state on the complement storage node C ($V_{SS}$ or $V_{DD}$).

Ideally, the inverters 104(1), 104(2) will be symmetrically matched so that the SRAM bit cell 102 is not skewed to favor settling to one voltage state over the other. For example, length L and threshold voltages $V_{TH}$ of complementary pull-up PFETs 106P(1), 106P(2) and complementary pull-down NFETs 106N(1), 106N(2) can be sized to generate a same voltage noise $V_{NOISE}$. As shown in FIG. 2A, ideally, the SRAM bit cell 102 in FIG. 1 has a neutral skew, wherein the inverters 104(1), 104(2) are symmetrically matched to generate a PUF output that is logic '0' for approximately half of the PUF read operations and logic '1' for approximately the other half of the PUF read operations. However, process variations can cause the complementary pull-up PFETs 106P(1), 106P(2) and complementary pull-down NFETs 106N(1), 106N(2) in the inverters 104(1), 104(2) in the SRAM bit cell 102 in FIG. 1 to be mismatched, and thus be skewed towards one voltage state. This is shown by example in FIG. 2B. As shown in FIG. 2B, random noise $\sigma_{NOISE}$ resulting from process variation $\Delta_{PV}$ skews the voltage state (i.e., neutral-skewed) of the SRAM bit cell 102 to always generate a logic '1' PUF output.

Thus, the SRAM PUF cell 100 in FIG. 1 can be used to provide PUF memory cells by taking advantage of this imbalance in the inverters 104(1), 104(2) that will occur through process variation. A plurality of the SRAM PUF cells 100 can be used to generate random X-bit numbers at power-up through a read operation, such as chip identifications for example. The SRAM PUF cells 100 would be read and not written to first to obtain a random state at power-up. However, the reproducibility of the SRAM PUF cells 100 may be so inconsistent that a huge redundant array and sophisticated error correction scheme may be required to implement a PUF in SRAM. SRAM PUF cells 100 also can suffer from high error rates between cycles, temperature and supply power.

Another technique to provide a PUF cell is to use a spin-transfer torque (STT) magnetic tunnel junction (MTJ). In STT-MTJ devices, the spin polarization of carrier electrons, rather than a pulse of a magnetic field, is used to program the state stored in an MTJ device (i.e., a '0' or a '1'). FIG. 3 illustrates an MTJ 300 that can be provided as part of an MRAM bit cell 302 in an MRAM (not shown). An access transistor 304 is provided to control reading and writing to the MTJ 300. A drain D of the access transistor 304 is coupled to a bottom electrode 306 of the MTJ 300, which is coupled to a pinned layer 308 having a fixed or pinned magnetization direction. A word line WL is coupled to a gate G of the access transistor 304. A source S of the access transistor 304 is coupled to a voltage source $V_{SS}$ through a source line SL. The voltage source $V_{SS}$ provides a voltage $V_{SL}$ on the source line SL. A bit line BL is coupled to a top electrode 310 of the MTJ 300, which is coupled to a free layer 312 for example. The pinned layer 308 and the free layer 312 are separated by a tunnel barrier 314.

With continuing reference to FIG. 3, when writing data to the MRAM bit cell 302, the gate G of the access transistor 304 is activated by activating the word line WL. A write voltage differential between a voltage $V_{BL}$ on the bit line BL and the voltage $V_{SL}$ on the source line SL is applied to generate a write signal $I_W$ between the drain D and the source S of the access transistor 304 sufficient to change the magnetic orientation of the MTJ 300. If the magnetic orientation (i.e., direction) of the MTJ 300 is to be changed from anti-parallel (AP) to parallel (P), a write current $I_{AP-P}$ flowing from the free layer 312 to the pinned layer 308 is generated. This induces an STT at the free layer 312 to change the magnetic orientation of the free layer 312 to P with respect to the pinned layer 308. If the magnetic orientation is to be changed from P to AP, a current $I_{P-AP}$ flowing from the pinned layer 308 to the free layer 312 is produced, which induces an STT at the free layer 312 to change the magnetic orientation of the free layer 312 to AP with respect to the pinned layer 308. The resistance of the MTJ 300 is based on the magnetic orientation of the free layer 312. To read data from the MRAM bit cell 302, a read current $I_R$ that is less than a magnitude than the write current $I_W$ is injected into the MTJ 300 via the same current path used to write data. If the magnetic orientations of the MTJ's 300 free layer 312 and pinned layer 308 are oriented P to each other, the MTJ 300 presents a resistance that is different than the resistance the MTJ 300 would present if the magnetic orientations of the free layer 312 and the pinned layer 308 were in an AP magnetic orientation. The two different resistances represent a logic '0' and a logic '1' stored in the MTJ 300 that can be used as a PUF output.

The idea behind employing a STT-MRAM bit cell, such as the MRAM bit cell 302 in FIG. 3, in a PUF cell is based on exploiting the resistances of the MTJ 300 associated with the P and AP states of the MTJ 300. It has been observed that given a population of MTJs 300, when put in P and AP states, the MTJs 300 assume a possible range of values according to a Gaussian probability distribution function due to manufacturing process variations. The physical parameters of the devices' stacks lead to a dispersion of both P and AP resistances. Thus, use of an MRAM bit cell, such as the MRAM bit cell 302 in FIG. 3, in a PUF cell can exploit the process variations in the fabrication of the MTJ 300 and its resistance dispersion in such a way that this random physical phenomena can become a source of a robust, random output that may be used as a signature generation for such purposes, such as for chip identification as an example.

Employing MRAM bit cells as PUF cells demonstrate good reproducibility and randomness for PUF implementation with a small footprint bit cell. However, MRAM requires supporting access circuitry like sense amplifiers, write drivers, row/column decoders, and error correcting code (ECC) schemes and related circuitry. However, it is common for a PUF security key to be a relatively small bit size, which makes this additional overhead expensive.

SUMMARY OF THE DISCLOSURE

Aspects disclosed herein include magneto-resistive random access memory (MRAM) employing an integrated physically unclonable function (PUF) memory. In this regard, in aspects disclosed herein, an MRAM is provided that includes an MRAM array comprising a plurality of MRAM bit cells organized in row and column format. For example, the MRAM bit cells may each include a magnetic tunnel junction (MTJ) that can be programmed, such as by spin-torque-transfer (STT), to change the magnetization state of a free layer to be in either a parallel (P) or anti-parallel (AP) state to designate the storage of a logic '0' or '1' memory state. Data words are read and written to the MRAM bit cells via memory row access controlled by a respective word line. In aspects disclosed herein, certain memory rows of MRAM bit cells in the MRAM array are designated as an MRAM data array. Certain columns of MRAM bit cells in the MRAM data array are designated as reference MRAM bit cells and programmed with logic '0' and '1' memory states. In this manner, in response to a read operation in the MRAM data array, data MRAM bit cells and reference MRAM bit cells in the memory row activated by the read operation are accessed. The resistance sensed from the data MRAM bit cells in the accessed memory row is compared to a reference resistance between the reference MRAM bit cells programmed with both a logic '0' and logic '1' value in the accessed memory row. The difference in sensed resistance between the data MRAM bit cells and the reference resistance of the reference MRAM bit cells is used to determine if the accessed data MRAM bit cells for the read operation store a logic '0' or logic '1' value. Comparing sensed resistance of the data MRAM bit cells to the reference MRAM bit cells for a read operation has the effect of negating or mitigating process variations that can skew the resistance of the MRAM bit cells, because the data MRAM bit cells and the reference MRAM bit cells are fabricated in the same semiconductor die, and thus both experience the same or similar process variations that skew resistance.

In additional aspects disclosed herein, to additionally provide an integrated PUF functionality in the MRAM, certain MRAM bit cells in the MRAM array (e.g., one or more memory rows of MRAM bit cells) are designated as PUF MRAM bit cells to form an MRAM PUF array in the MRAM array. For example, a programmer may configure certain MRAM bit cells in the MRAM array to be PUF MRAM bit cells for an MRAM PUF array. Thus, the MRAM PUF array will include one or more memory rows of both data MRAM bit cells and reference MRAM bit cells. A memory access circuit is included in the MRAM that is configured to program the PUF MRAM bit cells in the MRAM PUF array to the same memory state (e.g., logic '0' or '1' memory state) in a configuration mode. Then, in response to a PUF read operation in the MRAM PUF array, the PUF MRAM bit cells and reference MRAM bit cells in the selected memory row in the MRAM PUF array activated by the PUF read operation are accessed. The resistance sensed from the PUF MRAM bit cells is compared to the reference resistance between the reference MRAM bit cells in the accessed memory row in the memory access circuit. The difference in sensed resistance between the PUF MRAM bit cells and the reference resistance of the reference MRAM bit cells is used to generate a PUF output. This difference in resistance between the PUF MRAM bit cells and the reference MRAM bit cells will be unpredictable in nature since the PUF MRAM bit cells and the reference MRAM bit cells are all initially programmed to the same memory state. For example, by integrating the MRAM PUF array into an MRAM array that also contains an MRAM data array, access circuitry, such as sense amplifiers, write drivers, decoders, for example, can be shared to control access to the MRAM array for both memory read and PUF read operations, thus saving memory area as opposed to providing a PUF memory having its own dedicated access circuitry separate from a data memory.

In this regard, in one exemplary aspect, a memory access circuit for controlling a PUF operation accessing MRAM bit cells in an MRAM array comprising an MRAM data array comprising at least one MRAM bit cell row circuit of data MRAM bit cells and an MRAM PUF array comprising at least one MRAM bit cell row circuit of PUF MRAM bit cells is provided. The memory access circuit comprises a write driver circuit configured to generate a reference write signal to program the at least one PUF MRAM bit cell in at least one MRAM bit cell column circuit to a reference memory state, in response to a PUF write operation selecting an MRAM bit cell row circuit to be written in the MRAM PUF array. The memory access circuit also comprises a reference write driver circuit configured to generate a second reference write signal to program at least one reference MRAM bit cell in the at least one reference MRAM bit cell column circuit to the reference memory state, in response to the PUF write operation selecting the MRAM bit cell row circuit to be written in the MRAM PUF array. The memory access circuit further comprises a data output circuit configured to, in response to a PUF read operation selecting an MRAM bit cell row circuit of PUF MRAM bit cells to be read, receive a PUF data signal representing a resistance of the at least one PUF MRAM bit cell in the at least one MRAM bit cell column circuit for the selected MRAM bit cell row circuit for the PUF read operation. The data output circuit is also configured to receive a reference signal representing a resistance of the at least one reference MRAM bit cell in the at least one reference MRAM bit cell column circuit for the selected MRAM bit cell row circuit for the PUF read operation, compare the PUF data signal to the reference signal, and generate a PUF output based on a difference between the PUF data signal and the reference signal.

In another exemplary aspect, a memory access circuit for controlling a PUF operation accessing MRAM bit cells in an MRAM array comprising an MRAM data array comprising at least one MRAM bit cell row circuit of data MRAM bit cells and an MRAM PUF array comprising at least one MRAM bit cell row circuit of PUF MRAM bit cells is provided. The memory access circuit comprises a means for generating a reference write signal to program at least one PUF MRAM bit cell in at least one MRAM bit cell column circuit to a reference memory state, in response to a PUF write operation selecting an MRAM bit cell row circuit to be written in the MRAM PUF array. The memory access circuit also comprises a means for generating a second reference write signal to program the at least one PUF MRAM bit cell in the at least one reference MRAM bit cell column circuit to the reference memory state, in response to the PUF write operation selecting the MRAM bit cell row circuit to be written in the MRAM PUF array. In response to a PUF read operation selecting an MRAM bit cell row circuit of PUF MRAM bit cells to be read, the memory access circuit comprises a means for receiving a PUF data signal representing a resistance of the at least one PUF MRAM bit cell in the at least one MRAM bit cell column circuit for the selected MRAM bit cell row circuit for the PUF read operation, a means for receiving a reference signal representing a resistance of the at least one reference MRAM bit cell in the at least one reference MRAM bit cell column circuit for the selected MRAM bit cell row circuit for the PUF read operation, a means for comparing the PUF data signal to the reference signal, and a means for generating a PUF output based on a difference between the PUF data signal and the reference signal.

In another exemplary aspect, a method of controlling access to at least one MRAM)bit cell in an MRAM array in an MRAM for performing a PUF operation is provided. The MRAM array comprises a plurality of MRAM bit cell row circuits each comprising a plurality of MRAM bit cells, and a plurality of MRAM bit cell column circuits each comprising an MRAM bit cell from an MRAM bit cell row circuit among the plurality of MRAM bit cell row circuits. The method comprises, in response to a PUF write operation selecting an MRAM bit cell row circuit of PUF MRAM bit cells to be written in an MRAM PUF array, the MRAM PUF array comprising one or more MRAM bit cell row circuits among the plurality of MRAM bit cell row circuits in the MRAM array, wherein the PUF MRAM bit cells in the MRAM PUF array comprise a plurality of PUF MRAM bit cells, generating a reference write signal to program at least one PUF MRAM bit cell in at least one MRAM bit cell column circuit to a reference memory state, and generating a second reference write signal to program at least one reference MRAM bit cell in at least one reference MRAM bit cell column circuit to the reference memory state. In response to a PUF read operation selecting an MRAM bit cell row circuit of PUF MRAM bit cells to be read, the method comprises receiving a PUF data signal representing a resistance of the at least one PUF MRAM bit cell in the at least one MRAM bit cell column circuit for the selected MRAM bit cell row circuit for the PUF read operation, receiving a reference signal representing a resistance of the at least one reference MRAM bit cell in the at least one reference MRAM bit cell column circuit for the selected MRAM bit cell row circuit for the PUF read operation, comparing the PUF data signal to the reference signal, and generating a PUF output based on a difference between the PUF data signal and the reference signal.

In another exemplary aspect, an MRAM is provided. The MRAM comprises an MRAM array. The MRAM array comprises a plurality of MRAM bit cell row circuits each comprising a plurality of MRAM bit cells, and a plurality of MRAM bit cell column circuits each comprising an MRAM bit cell from an MRAM bit cell row circuit among the plurality of MRAM bit cell row circuits. The MRAM array also comprises an MRAM data array comprising one or more MRAM bit cell row circuits among the plurality of MRAM bit cell row circuits in the MRAM array, wherein the MRAM bit cells in the MRAM data array comprise a plurality of data MRAM bit cells. The MRAM array further comprises an MRAM PUF array comprising one or more MRAM bit cell row circuits among the plurality of MRAM bit cell row circuits in the MRAM array not included in the MRAM data array, wherein MRAM bit cells in the MRAM PUF array comprise a plurality of PUF MRAM bit cells. The MRAM array also comprises a memory access circuit. The memory access circuit comprises a write driver circuit coupled to the MRAM array, the write driver circuit configured to generate a reference write signal to program at least one reference MRAM bit cell in at least one MRAM bit cell column circuit to a reference memory state, in response to a PUF write operation selecting the MRAM bit cell row circuit to be written in the MRAM PUF array. The memory access circuit also comprises a reference write driver circuit configured to generate a second reference write signal to program the at least one reference MRAM bit cell in at least one reference MRAM bit cell column circuit to the reference memory state, in response to the PUF write operation selecting the MRAM bit cell row circuit to be written in the MRAM PUF array. The memory access circuit further comprises a data output circuit configured to, in response to a PUF read operation selecting an MRAM bit cell row circuit to be read, receive a PUF data signal representing a resistance of the at least one PUF MRAM bit cell in the at least one MRAM bit cell column circuit for the selected MRAM bit cell row circuit for the PUF read operation. The data output circuit is also configured to receive a reference signal representing a resistance of the at least one reference MRAM bit cell in the at least one reference MRAM bit cell column circuit for the selected MRAM bit cell row circuit for the PUF read operation, compare the PUF data signal to the reference signal, and generate a PUF output based on a difference between the PUF data signal and the reference signal.

DETAILED DESCRIPTION

Figure 1:
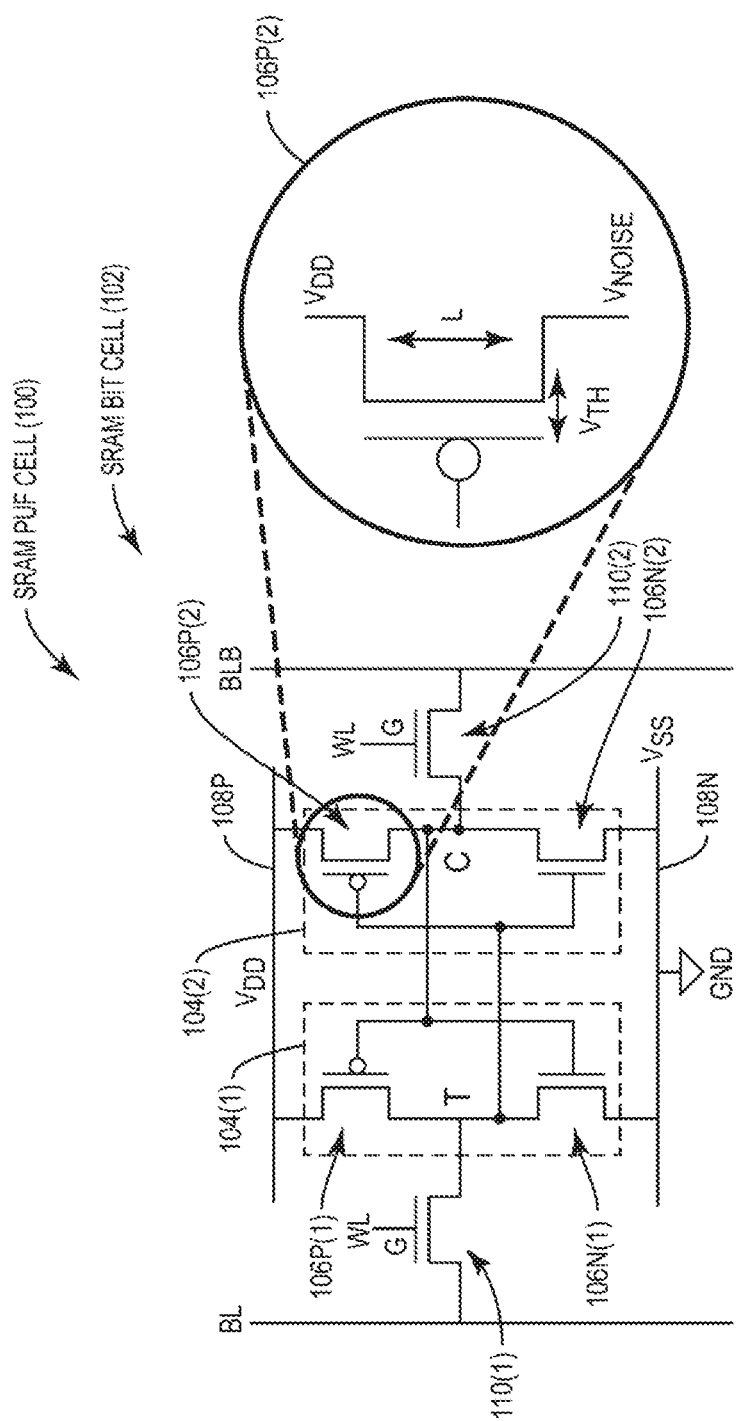
FIG. 1 is a schematic diagram of an exemplary static random access memory (SRAM) bit cell that can be used as a physically unclonable function (PUF) cell.
Figure 2A:
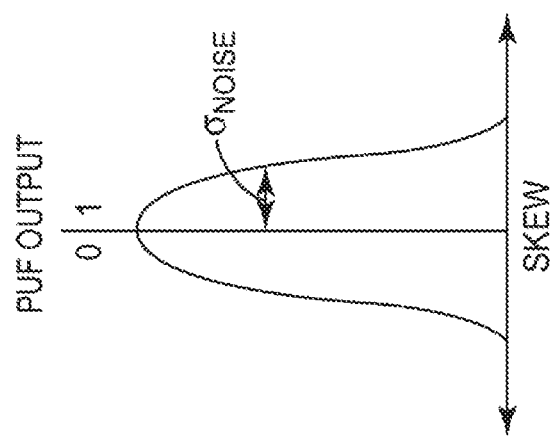
FIGS. 2A and 2B are graphs illustrating neutral-skew and a 1-skew, respectively, in an SRAM bit cell.
Figure 2B:
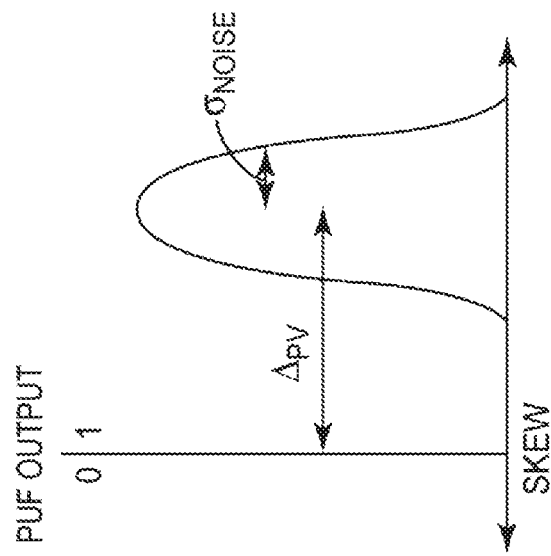
Figure 3:
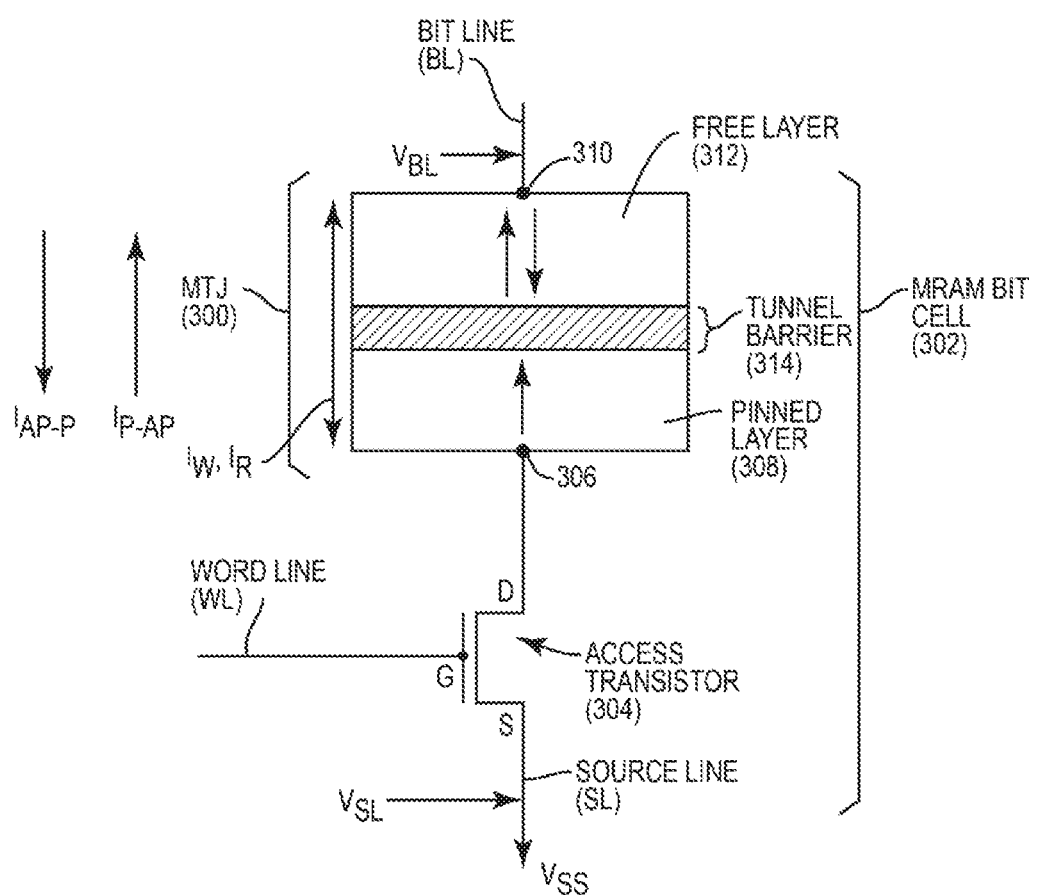
FIG. 3 is a schematic diagram of an exemplary spin-transfer torque (STT) magneto-resistive random access memory (MRAM) bit cell that can be used as a PUF cell.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include magneto-resistive random access memory (MRAM) employing an integrated physically unclonable function (PUF) memory. In this regard, in aspects disclosed herein, an MRAM is provided that includes an MRAM array comprising a plurality of MRAM bit cells organized in row and column format. For example, the MRAM bit cells may each include a magnetic tunnel junction (MTJ) that can be programmed, such as by spin-torque-transfer (STT), to change the magnetization state of a free layer to be in either a parallel (P) or anti-parallel (AP) state to designate the storage of a logic '0' or '1' memory state. Data words are read and written to the MRAM bit cells via memory row access controlled by a respective word line. In aspects disclosed herein, certain memory rows of MRAM bit cells in the MRAM array are designated as an MRAM data array. Certain columns of MRAM bit cells in the MRAM data array are designated as reference MRAM bit cells and programmed with logic '0' and '1' memory states. In this manner, in response to a read operation in the MRAM data array, data MRAM bit cells and reference MRAM bit cells in the memory row activated by the read operation are accessed. The resistance sensed from the data MRAM bit cells in the accessed memory row is compared to a reference resistance between the reference MRAM bit cells programmed with both a logic '0' and logic '1' value in the accessed memory row. The difference in sensed resistance between the data MRAM bit cells and the reference resistance of the reference MRAM bit cells is used to determine if the accessed data MRAM bit cells for the read operation store a logic '0' or logic '1' value. Comparing sensed resistance of the data MRAM bit cells to the reference MRAM bit cells for a read operation has the effect of negating or mitigating process variations that can skew the resistance of the MRAM bit cells, because the data MRAM bit cells and the reference MRAM bit cells are fabricated in the same semiconductor die, and thus both experience the same or similar process variations that skew resistance.

In additional aspects disclosed herein, to additionally provide an integrated PUF functionality in the MRAM, certain MRAM bit cells in the MRAM array (e.g., one or more memory rows of MRAM bit cells) are designated as PUF MRAM bit cells to form an MRAM PUF array in the MRAM array. For example, a programmer may configure certain MRAM bit cells in the MRAM array to be PUF MRAM bit cells for an MRAM PUF array. Thus, the MRAM PUF array will include one or more memory rows of both data MRAM bit cells and reference MRAM bit cells. A memory access circuit is included in the MRAM that is configured to program the PUF MRAM bit cells in the MRAM PUF array to the same memory state (e.g., logic '0' or '1' memory state) in a configuration mode. Then, in response to a PUF read operation in the MRAM PUF array, the PUF MRAM bit cells and reference MRAM bit cells in the selected memory row in the MRAM PUF array activated by the PUF read operation are accessed. The resistance sensed from the PUF MRAM bit cells is compared to the reference resistance between the reference MRAM bit cells in the accessed memory row in the memory access circuit. The difference in sensed resistance between the PUF MRAM bit cells and the reference resistance of the reference MRAM bit cells is used to generate a PUF output. This difference in resistance between the PUF MRAM bit cells and the reference MRAM bit cells will be unpredictable in nature since the PUF MRAM bit cells and the reference MRAM bit cells are all initially programmed to the same memory state. For example, by integrating the MRAM PUF array into an MRAM array that also contains an MRAM data array, access circuitry, such as sense amplifiers, write drivers, decoders, for example, can be shared to control access to the MRAM array for both memory read and PUF read operations, thus saving memory area as opposed to providing a PUF memory having its own dedicated access circuitry separate from a data memory.

Figure 4:
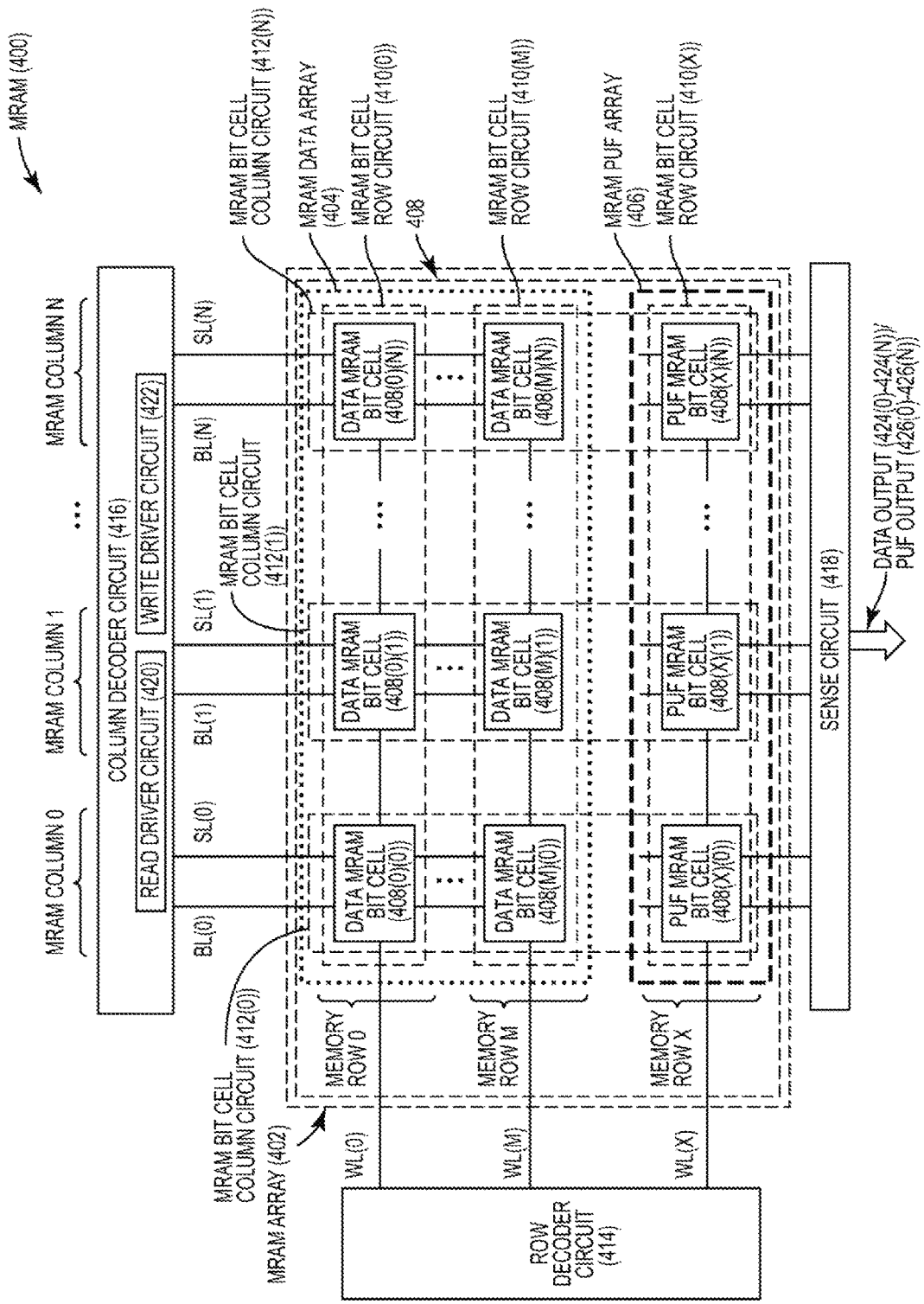
FIG. 4 is a schematic diagram of an exemplary memory system that includes an MRAM array that includes a MRAM data array comprising data MRAM bit cells for supporting data memory operations in the memory system, an integrated MRAM PUF array comprising PUF MRAM bit cells for supporting PUF operations, and common access circuitry that can be used to access the data MRAM bit cells for data memory operations and the PUF MRAM bit cells for PUF operations.

Before discussing exemplary details on the integration of data operations and PUF operations performed in an MRAM array that integrates an MRAM data array and MRAM PUF array, exemplary details of a memory system that includes an MRAM array with an integrated MRAM data array and MRAM PUF array that includes common access circuitry, such as sense amplifiers, write drivers, and decoders, for example, to control access to the MRAM array for both a memory read and PUF read operations are first discussed with regard to FIG. 4.

In this regard, FIG. 4 is a block diagram of an exemplary MRAM 400 that includes an MRAM array 402 that includes both an integrated MRAM data array 404 for supporting data memory operations and an MRAM PUF array 406 for supporting PUF operations. The MRAM 400 may be provided on a separate IC chip from a processor or integrated into the same IC chip as a processor. The MRAM 400 may be considered an MRAM in this example. As will be discussed in more detail below, the MRAM array 402 is separated or partitioned in this manner, so that the single MRAM array 402 can support both data memory operations and PUF operations using common memory access circuitry to save area in the MRAM 400. In this regard, the MRAM array 402 includes a plurality of MRAM bit cells 408 organized into memory row and columns, wherein each MRAM bit cell 408 is configured to store a memory state. For example, the MRAM bit cells 408 may include an MTJ that is configured to store a memory state as a function of a magnetic orientation of a free magnetization layer. In this example, certain designated MRAM bit cells 408 are included in the MRAM data array 404, and other MRAM bit cells 408 are included in the MRAM PUF array 406. For example, as shown in FIG. 4, the MRAM data array 404 includes a plurality MRAM bit cell row circuits 410(0)-410(M) each provided in a respective memory row 0-M. Each MRAM bit cell row circuit 410(0)-410(M) includes a plurality of data MRAM bit cells 408( )(0)-408( )(N) each provided in a respective memory column 0-N for storing data. For example, the MRAM data array 404 includes data MRAM bit cells 408(0)(0)-408(M)(N). Also, as shown in FIG. 4, the MRAM PUF array 406 includes a plurality of MRAM bit cell row circuits 410(X) each provided in a respective memory row X. Note that only one memory row X is shown, but the MRAM PUF array 406 may include multiple memory rows. Each MRAM bit cell row circuit 410(X) includes a plurality of PUF MRAM bit cells 408(X)(0)-408(X)(N) each provided in the respective memory column 0-N for generating a PUF output. The MRAM bit cells 408(0)(0)-408(M)(N) organized in their respective memory columns 0-N form respective MRAM bit cell column circuits 412(0)-412(N).

With continuing reference to FIG. 4, the MRAM 400 includes a row decoder circuit 414, a column decoder circuit 416, and a sense circuit 418. The row decoder circuit 414 is coupled to the MRAM array 402 via word lines WL(0)-WL(M) and WL(X). Word lines WL(0)-WL(M) are coupled to the data MRAM bit cells 408(0)(0)-408(M)(N) in the respective MRAM bit cell row circuits 410(0)-410(M). Word lines WL(X) are coupled to the PUF MRAM bit cells 408(X)(0)-408(X)(N) in the respective MRAM bit cell row circuits 410(X). The row decoder circuit 414 is configured to assert one or more word lines WL(0)-WL(M) in response to a particular address received by the MRAM 400 for data access operations to the MRAM data array 404. The row decoder circuit 414 is configured to assert one or more word lines WL(X) in response to a particular address received by the MRAM 400 for PUF access operations to the MRAM PUF array 406. The column decoder circuit 416 is coupled to the MRAM array 402 via bit lines BL(0)-BL(N) and source lines SL(0)-SL(N). The column decoder circuit 416 may include one or more read driver circuits 420 coupled to the MRAM bit cell column circuits 412(0)-412(N) to generate a read voltage on the bit lines BL(0)-BL(N) and/or the source lines SL(0)-SL(N) to read data from an MRAM bit cell 408(0)(0)-408(M)(N), 408(X)(0)-408(X)(N) in a respective MRAM bit cell column circuit 412(0)-412(N). The column decoder circuit 416 may also include one or more write driver circuits 422 coupled to the MRAM bit cell column circuits 412(0)-412(N) to generate a write voltage on the bit lines BL(0)-BL(N) and/or the source lines SL(0)-SL(N) to write data from an MRAM bit cell 408(0)(0)-408(M)(N), 408(X)(0)-408(X)(N) in a respective MRAM bit cell column circuit 412(0)-412(N).

With continuing reference to FIG. 4, the sense circuit 418 may be coupled to the MRAM array 402 via the bit lines BL(0)-BL(N) and the source lines SL(0)-SL(N). The sense circuit 418 may be configured to generate a data output 424(0)-424(N) or PUF output 426(0)-426(N) of 'N+1' bits based on voltages of the bit lines BL(0)-BL(N) and the source lines SL(0)-SL(N) in response to a data read or PUF read operation. The voltages of the bit lines BL(0)-BL(N) and the source lines SL(0)-SL(N) in response to a read operation are indicative of the memory state of the MRAM bit cells 408(0)(0)-408(M)(N), 408(X)(0)-408(X)(N) coupled to the bit lines BL(0)-BL(N) and the source lines SL(0)-SL(N). For example, in response to a PUF operation, the read driver circuit 420 asserts and de-asserts control signals to cause the MRAM bit cells 408(X)(0)-408(X)(N) in the selected MRAM bit cell row circuit 410(X) to generate and store PUF content in a read phase to generate the PUF output 426(0)-426(N). To illustrate, the sense circuit 418 may output the PUF output 426(0)-426(N) (e.g., a "response") in response to a particular memory address (e.g., a "challenge"). The row decoder circuit 414 and the column decoder circuit 416 may receive a memory address that is indicative of one or more of the MRAM PUF array 406. The row decoder circuit 414 may assert one or more word lines WL(X) to enable access to the indicated PUF MRAM bit cells 408(X)(0)-408(X)(N). The sense circuit 418 may generate the PUF output 426(0)-426(N) based on the voltages of the bit lines BL(0)-BL(N) and/or the source lines SL(0)-SL(N). In this manner, the MRAM PUF array 406 may output different PUF outputs 426(0)-426(N) (e.g., different "responses") based on different addresses (e.g., different "challenges").

As will also be discussed in more detail below, one or more of the MRAM bit cell column circuits 412(0)-412(N) in the MRAM PUF array 406 may be dedicated to provide reference MRAM bit cells 408(X)( ) whose sensed memory state characteristic (e.g., as a function of voltage or resistance) can be compared to a sensed memory state characteristic of other PUF MRAM bit cells 408(X)(0)-408(X)(N) in the same selected memory row X. In this manner, comparing the difference between the sensed memory state characteristics of the reference MRAM bit cell(s) 408(X)( ) and other accessed PUF MRAM bit cells 408(X)(0)-408(X)(N) in the same memory row X has the effect of cancelling or mitigating process variation in the PUF MRAM bit cells 408(X)(0)-408(X)(N). This is because the PUF MRAM bit cells 408(X)(0)-408(X)(N) and the reference MRAM bit cell(s) 408(X)( ) are fabricated in the same semiconductor die in this example and thus both experience the same or similar process variations that skew their memory state characteristics (e.g., resistance). Otherwise, memory state characteristics in the PUF MRAM bit cells 408(X)(0)-408(X)(N) may be skewed due to process variation, which will then result in the PUF output 426(0)-426(N) being skewed to a particular memory state, rendering it not random.

Thus, with the MRAM 400 in FIG. 4, a programmer or application can decide which MRAM bit cell row circuits 410(0)-410(M), 410(X) are assigned to the MRAM data array 404 for data read and write operations, and which MRAM bit cell row circuits 410(0)-410(M), 410(X) are assigned to the MRAM PUF array 406 for PUF operations. Thus, the programmer or application has flexibility in determining the relative size of the MRAM data array 404 and the MRAM PUF array 406 based on how the programmer or application will cause the MRAM bit cell row circuits 410(0)-410(M), 410(X) to be accessed. For example, for PUF operations, the MRAM bit cell row circuit 410(X) in the MRAM PUF array 406 may be read as part of the MRAM PUF array 406 without conducting a write operation to get a random output as the PUF output 426(0)-426(N). However, for data read and write operations, the MRAM bit cell row circuits 410(0)-410(M) may be accessed as part of the MRAM data array 404 and written and read to be used as memory storage for conducting processor-based operations. The row decoder circuit 414, the column decoder circuit 416, and the sense circuit 418 in the MRAM 400 can be employed to access and control the MRAM bit cells 408(0)(0)-408(M)(N), 408(X)(0)-408(X)(N) in their respective MRAM data array 404 and MRAM PUF array 406, to perform both data and PUF operations.

A product identifier (or an identification or authorization process using PUF challenges and responses), a cryptographic key, or both may include (or be generated based on) the PUF output 426(0)-426(N). Because the PUF output 426(0)-426(N) is based on process-dependent variations at components (e.g., MTJ devices and transistors) of the PUF MRAM bit cells 408(X)(0)-408(X)(N) in the MRAM PUF array 406, the device identifier or the cryptographic key may be difficult or impossible to generate at another device. For example, another device including an MRAM array of similarly configured PUF MRAM bit cells 408(X)(0)-408(X)(N) in the MRAM PUF array 406 will likely generate a different PUF output 426(0)-426(N) in response to a particular challenge due to device-specific differences in transistor strengths and process-dependent characteristics of the PUF MRAM bit cells 408(X)(0)-408(X)(N) (e.g., resistance). Thus, another MRAM with the same configuration as the MRAM PUF array 406 in the MRAM 400 in FIG. 4 may generate a different PUF output 426(0)-426(N), and therefore a different device identifier (or cryptographic key). Thus, the MRAM 400 in FIG. 4 may enable generation of multiple different PUF outputs 426(0)-426(N) based on different "challenges." Because each PUF output 426(0)-426(N) is based on differences in transistor strengths and process-dependent characteristics of the PUF MRAM bit cells 408(X)(0)-408(X)(N), each PUF output 426(0)-426(N) is difficult (or impossible) to replicate using a different device. In this manner, the MRAM 400 provides robust and unique PUF outputs 426(0)-426(N) that are not degraded due to process variations of components outside of the PUF MRAM bit cells 408(X)(0)-408(X)(N), such as in the word lines WL(X), the bit lines BL(0)-BL(N), the source lines SL(0)-SL(N), the sense circuit 418, etc.

The MRAM 400 in FIG. 4 supports PUF operations in the MRAM PUF array 406. In this regard, as will be discussed in more detail below, the sense circuit 418 is configured to program the PUF MRAM bit cells 408(X)(0)-408(X)(N) in the MRAM PUF array 406 to the same memory state (e.g., logic '0' or '1' memory state) in a configuration mode. Then, in response to a PUF read operation to the MRAM PUF array 406, the PUF MRAM bit cells 408(X)(0)-408(X)(N) and the reference MRAM bit cell(s) 408(X)( ) in the selected memory row X in the MRAM PUF array 406 activated by word line WL(X) for the PUF read operation are accessed. In one example, resistance sensed from the accessed PUF MRAM bit cells 408(X)(0)-408(X)(N) is compared to the reference resistance in the reference MRAM bit cell(s) 408(X)( ) in the accessed memory row X in the sense circuit 418. The difference in sensed resistance between the PUF MRAM bit cells 408(X)(0)-408(X)(N) and the reference resistance of the reference MRAM bit cell(s) 408(X)( ) is used to generate the PUF output 426(0)-426(N). This difference in resistances between the PUF MRAM bit cells 408(X)(0)-408(X)(N) and the reference MRAM bit cell(s) 408(X)( ) will be unpredictable in nature since the PUF MRAM bit cells 408(X)(0)-408(X)(N) and the reference MRAM bit cell(s) 408(X)( ) are all initially programmed to the same memory state.

Figure 5:
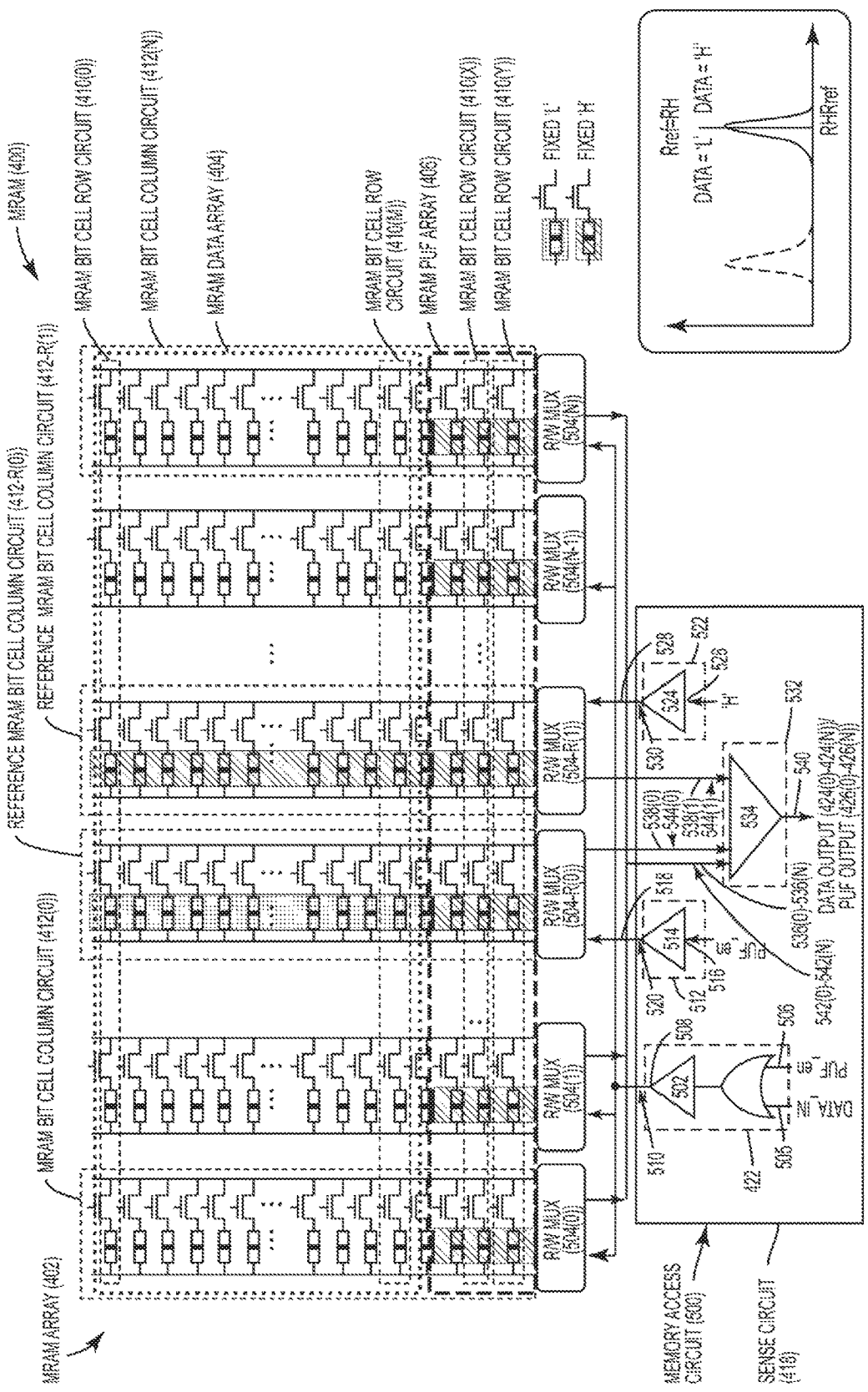
FIG. 5 is a schematic diagram of another exemplary memory system that includes an MRAM array that includes a MRAM data array comprising data MRAM bit cells for supporting data memory operations in the memory system, an integrated MRAM PUF array comprising PUF MRAM bit cells for supporting PUF operations, and common access circuitry that can be used to access the data MRAM bit cells for data memory operations and the PUF MRAM bit cells for PUF operations.
Figure 5:
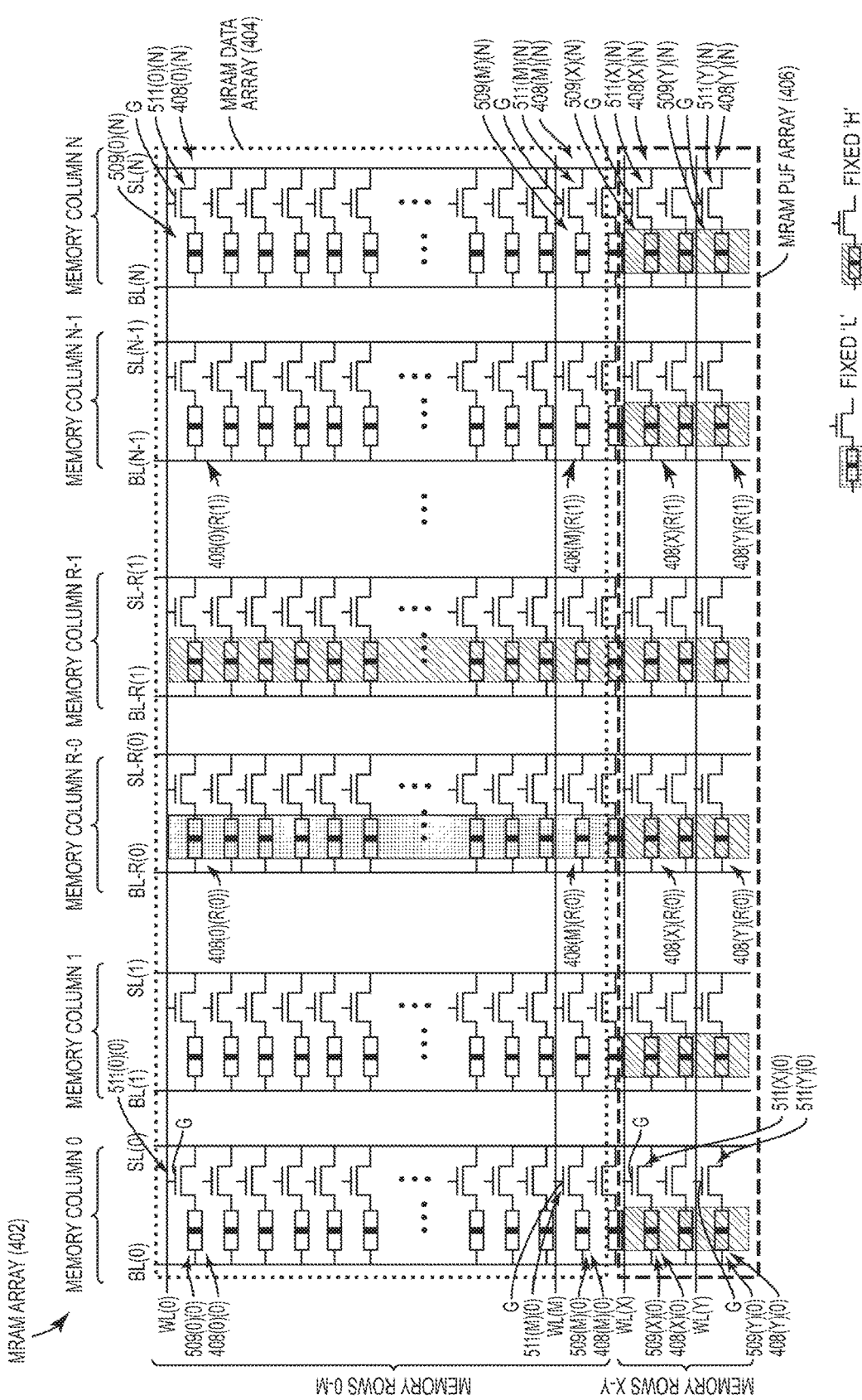

FIG. 5 is a schematic diagram of the MRAM 400 in FIG. 4 illustrated to explain more exemplary detail of the MRAM array 402 including the MRAM data array 404 to support data memory operations and an integrated MRAM PUF array 406 supporting PUF operations. Common elements between the MRAM 400 in FIG. 4 and the MRAM 400 in FIG. 5 are shown with common element numbers between FIGS. 4 and 5 and thus will not be re-described. To support read and write operations to the MRAM array 402, whether it be for data operations or PUF write operations, a memory access circuit 500 is provided. The memory access circuit 500 includes the write driver circuit 422. In this example, the write driver circuit 422 includes an amplifier 502 coupled to read/write selector circuits 504(0)-504(N) provided in each memory column 0-N that are coupled to the respective bit lines BL(0)-BL(N) and source lines SL(0)-SL(N). The read/write selector circuits 504(0)-504(N) are configured to drive the appropriate signal (e.g., voltage) onto respective bit lines BL(0)-BL(N) and source lines SL(0)-SL(N) to perform read and write operations in a respective MRAM bit cell column circuit 412(0)-412(N). The read/write selector circuits 504(0)-504(N) may be multiplexor circuits for selecting inputs to pass based on whether an operation is a read write operation. The write driver circuit 422 includes a write driver data input 505, a PUF enable input 506, and a write driver output 508. The write driver output 508 is coupled to read/write selector circuits 504(0)-504(N) provided in each memory column 0-N that are coupled to respective bit lines BL(0)-BL(N) and source lines SL(0)-SL(N). The write driver circuit 422 is configured to generate a write signal 510 on the write driver output 508 to write a memory state to the MRAM bit cells 408(0)(0)-408(M)(N) for a data write operation and to PUF MRAM bit cells 408(X)(0)-408(Y)(N) for a PUF write operation. For a data write operation, the data to be written DATA_IN is asserted on the write driver data input 505. For a PUF write operation, a PUF write enable signal PUF_en is asserted in a PUF write enable state to cause the write driver circuit 422 to generate a reference signal (e.g., a voltage) on the write driver output 508 to program the PUF MRAM bit cells 408(X)(0)-408(Y)(N) in the selected memory row X—Y based on the assertion of a respective word line WL(X)-WL(Y). As will be discussed in more detail below, to perform a PUF operation, in one example, all the PUF MRAM bit cells 408(X)(0)-408(Y)(N) are written to the same memory state so that when a subsequent PUF read operation is performed by comparing a memory state of reference MRAM bit cells 408(X)(R(0))-408(Y)(R(1)) and PUF MRAM bit cells 408(X)(0)-408(Y)(N) in a selected memory row X-Y in the MRAM PUF array 406, a random PUF output 426(0)-426(N) is achieved.

In the example of FIG. 5, the MRAM bit cells 408(0)(0)-408(M)(N), 408(X)(0)-408(Y)(N) each include MTJs 509(0)(0)-509(M)(N), 509(X)(0)-509(Y)(N) coupled to a respective bit line BL(0)-BL(N). The MRAM bit cells 408(0)(0)-408(M)(N), 408(X)(0)-408(Y)(N) also each include an access transistor 511(0)(0)-511(M)(N), 511(X)(0)-511(Y)(N) coupled to a respective source line SL(0)-SL(N) and the MTJ 509(0)(0)-509(M)(N), 509(X)(0)-509(Y)(N). A gate G of each access transistor 511(0)(0)-511(M)(N), 511(X)(0)-511(Y)(N) is coupled to a respective word line WL(0)-WL(M), WL(X)-WL(Y) to control activation of the access transistor 511(0)(0)-511(M)(N), 511(X)(0)-511(Y)(N) to in turn allow current to flow through the MTJs 509(0)(0)-509(M)(N), 509(X)(0)-509(Y)(N) between the respective bit line BL(0)-BL(N) and source line SL(0)-SL(N) for read and write operations, depending on the MRAM bit cell row circuit 410(0)-410(M), 410(X)-410(Y) selected by the respective word line WL(0)-WL(M), WL(X)-WL(Y).

With continuing reference to FIG. 5, the memory access circuit 500 also includes a reference write driver circuit 512. In this example, the reference write driver circuit 512 includes an amplifier 514. The reference write driver circuit 512 includes a reference PUF enable input 516 and a reference write driver output 518 coupled to at least one read/write selector circuit 504(0)-504(N) that is in a reference MRAM bit cell column circuit 412-R(0)-412-R(1), which is MRAM bit cell column circuit 412-R(0) in this example. The reference write driver circuit 512 is configured to generate a second reference write signal 520 on the reference write driver output 518 based on the PUF enable signal PUF_en on the reference PUF enable input 516. The generation of the second reference write signal 520 by the reference write driver circuit 512 programs the reference MRAM bit cells 408(X)(R(0))-408(Y)(R(0)) in the reference MRAM bit cell column circuit 412-R(0) to a reference memory state, in response to the PUF write operation selecting an MRAM bit cell row circuit 410(X)-410(Y) to be written in the MRAM PUF array 406. In this example, MRAM bit cell column circuits 412-R(0), 412-R(1) are designated as reference MRAM bit cell column circuits wherein the MRAM bit cells 408(0)(R(0))-408(M)(R(1)), 408(Y)(R(0))-408(X)(R(1)) are designated as reference MRAM bit cells.

For a PUF operation, the PUF enable signal PUF_en is in a PUF enable state. For a non-PUF operation, the PUF enable signal PUF_en is in a PUF disable state. In this manner, for a non-PUF read operation, a logic '0' can be stored in the reference MRAM bit cells 408(0)(R(0))-408(M)((R(0)) for the selected memory row 0-M to compare to the memory state of the read MRAM bit cells 408(0)(0)-408(M)(N) not in the reference MRAM bit cell column circuits 412-R(0), 412-R(1). As will be discussed in more detail below, to perform a PUF operation, in one example, the PUF enable signal PUF_en is in a PUF enable state. In this state, all the reference MRAM bit cells 408(X)(R(0))-408(Y)(R(1)) are written to the same memory state (a high or logic '1' memory state in this example) so that when a subsequent PUF read operation is performed by comparing a memory state of the reference MRAM bit cells 408(X)(R(0))-408(Y)(R(1)) and PUF MRAM bit cells 408(X)(0)-408(Y)(N) in a selected memory row X-Y in the MRAM PUF array 406, a random PUF output 426(0)-426(N) is achieved.

With continuing reference to FIG. 5, the memory access circuit 500 in this example also includes an optional, second reference write driver circuit 522. In this example, the second reference write driver circuit 522 includes an amplifier 524. The second reference write driver circuit 522 includes a reference PUF enable input 526 and a reference write driver output 528 coupled to at least one read/write selector circuit 504(0)-504(N) that is in a reference MRAM bit cell column circuit 412-R(0)-412-R(1), which is MRAM bit cell column circuit 412-R(1) in this example. The second reference write driver circuit 522 is configured to generate a second reference write signal 530 on the reference write driver output 528 based on a voltage of a logic '1' or high 'H' state on the reference PUF enable input 526. The generation of the second reference write signal 530 by the second reference write driver circuit 522 programs the reference MRAM bit cells 408(X)(R(0))-408(Y)(R(0)) in the reference MRAM bit cell column circuit 412-R(1) to a high or logic '1' reference memory state, in response to the PUF write operation selecting an MRAM bit cell row circuit 410(X)-410(Y) to be written in the MRAM PUF array 406.

The second reference write driver circuit 522 is included in this example, because the MRAM data array 404 includes two reference MRAM bit cell column circuits 412-R(0), 412-R(1) for storing a logic '0' and logic '1' memory states respectively. In this manner, for a non-PUF read operation, the average of the logic '0' and logic '1' memory states stored in the reference MRAM bit cells 408(0)(R(0))-408(M)((R(1)) for the selected memory row 0-M can be used to compare to the memory state of the read MRAM bit cells 408(0)(0)-408(M)(N) not in the reference MRAM bit cell column circuits 412-R(0), 412-R(1). Thus, to be compatible with this design, in this example, the reference write driver circuit 512 and second reference write driver circuit 522 are provided to be able to write memory states to reference MRAM bit cells 408(0)(R(0))-408(M)((R(1)) in both reference MRAM bit cell column circuits 412-R(0), 412-R(1). Note that only one write driver circuit, for example the reference write driver circuit 512, may be included in an alternative design. For example, only one reference MRAM bit cell column circuit 412-R(0) may be included in the MRAM array 402 where only one reference memory state need be written in the MRAM array 402.

With continuing reference to FIG. 5, the memory access circuit 500 also includes a data output circuit 532. In this example, the data output circuit 532 includes an amplifier 534. The data output circuit 532 includes MRAM bit cell column inputs 536(0)-536(N) coupled the MRAM bit cell column inputs 536(0)-536(N) coupled the MRAM bit cell column circuits 412(0)-412(N) that are not the reference MRAM bit cell column circuits 412-R(0), 412-R(1). The data output circuit 532 also includes two reference MRAM bit cell column inputs 538(0), 538(1) in this example that are coupled to respective reference MRAM bit cell column circuits 412-R(0), 412-R(1). Note that only one reference MRAM bit cell column input 538(0) may be provided if one reference MRAM bit cell column circuit 412-R(0) were provided. The data output circuit 532 also includes a data output 540. In this regard, in response to a PUF read operation selecting an MRAM bit cell row circuit 410(X)-410(Y) of PUF MRAM bit cells 408(X)(0)-408(Y)(N) to be read, the data output circuit 532 is configured to receive data signals 542(0)-542(N) representing a resistance of the PUF MRAM bit cells 408(X)(0)-408(Y)(N) in the MRAM bit cell column circuits 412(0)-412(N) for the selected MRAM bit cell row circuit 410(X)-410(Y) in the MRAM PUF array 406 for the PUF read operation on the MRAM bit cell column inputs 536(0)-536(N). Also, in response to a PUF read operation selecting an MRAM bit cell row circuit 410(X)-410(Y) of PUF MRAM bit cells 408(X)(0)-408(Y)(N) to be read, the data output circuit 532 is configured to receive first and second reference signals 544(0), 544(1) representing a resistance of the reference MRAM bit cells 408(X)(R(0))-408(Y)(R(1)) in the MRAM bit cell column circuits 412-R(0), 412-R(1) for the selected MRAM bit cell row X-Y for the PUF read operation on the reference MRAM bit cell column inputs 538(0), 538(1). The data output circuit 532 is configured to compare the data signals 542(0)-542(N) to the first and second reference signals 544(0), 544(1). The data output circuit 532 is configured to generate the PUF output 426(0)-426(N) on the data output 540 based on the difference between the respective data signals 542(0)-542(N) and the reference signals 544(0), 544(1). For example, the data signals 542(0)-542(N) and the reference signals 544(0), 544(1) may be voltage signals that are indicative of the respective resistances of the PUF MRAM bit cells 408(X)(0)-408(Y)(N) and the reference MRAM bit cell column inputs 538(0), 538(1). For example, FIG. 5 shows the resistance $R_{REF}$ as a high or logic '1' memory state due to the programming of the reference MRAM bit cells 408(X)(R(0))-408(Y)(R(1)) to a high or logic '1' memory state. Thus, a comparison of the data signals 542(0)-542(N) and the reference signals 544(0), 544(1) each representing a high or logic '1' memory state will yield a random PUF output 426(0)-426(N) on the data output 540.

Figure 6:
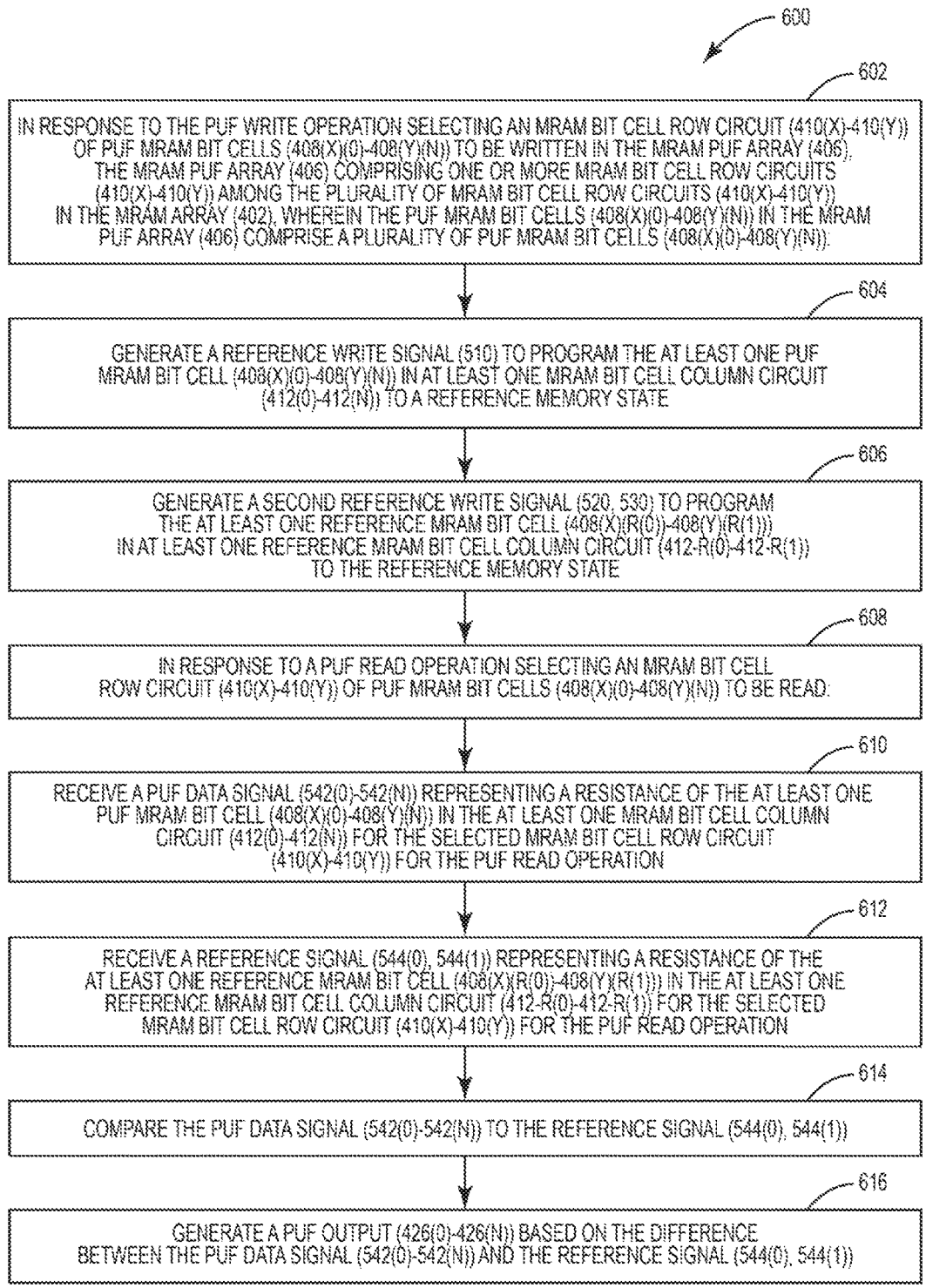
FIG. 6 is a flowchart illustrating an exemplary process of programming PUF MRAM bit cells and reference MRAM bit cells in the MRAM PUF array in the MRAM array in FIG. 5 to the same memory state and subsequently performing a PUF read operation to the MRAM PUF array to generate a PUF output based on a comparison of the resistances of the read PUF MRAM bit cells and the reference MRAM bit cells.

FIG. 6 is a flowchart illustrating an exemplary process 600 of programming reference MRAM bit cells 408(X)(0)-(Y)(N) and reference MRAM bit cells 408(X)(R(0))-(Y)(R(1)) in the MRAM PUF array 406 in the MRAM array 402 in FIG. 5 to the same memory state, and then subsequently performing a PUF read operation to the MRAM PUF array 406 to generate the PUF output 426(0)-426(N) based on a comparison of the resistances of the read PUF MRAM bit cells 408(X)(0)-408(Y)(N) and the reference MRAM bit cells 408(X)(0)-408(Y)(N). In this regard, as shown in FIG. 6, to conduct a PUF read operation, a PUF write operation is first performed by selecting an MRAM bit cell row circuit 410(X)-410(Y) of PUF MRAM bit cells 408(X)(0)-408(Y)(N) to be written in the MRAM PUF array 406, the MRAM PUF array 406 comprising one or more MRAM bit cell row circuits 410(X)-410(Y) among the plurality of MRAM bit cell row circuits 410(X)-410(Y) in the MRAM array 402, wherein the PUF MRAM bit cells 408(X)(0)-408(Y)(N) in the MRAM PUF array 406 comprise a plurality of PUF MRAM bit cells 408(X)(0)-408(Y)(N) (block 602). The process 600 then includes generating a reference write signal 510 to program the at least one PUF MRAM bit cell 408(X)(0)-408(Y)(N) in the at least one MRAM bit cell column circuit 412(0)-412(N) to a reference memory state (block 604). The process 600 also includes generating a second reference write signal 520, 530 to program the at least one reference MRAM bit cell 408(X)(R(0))-408(Y)(R(1)) in the at least one reference MRAM bit cell column circuit 412-R(0)-412-R(1) to the reference memory state (block 606).

With continuing reference to FIG. 6, a PUF read operation can be conducted in response to a PUF read operation selecting an MRAM bit cell row circuit 410(X)-410(Y) of PUF MRAM bit cells 408(X)(0)-408(Y)(N) to be read (block 608). The PUF read operation includes receiving a data signal 542(0)-542(N) representing a resistance of the at least one PUF MRAM bit cell 408(X)(0)-408(Y)(N) in the at least one MRAM bit cell column circuit 412(0)-412(N) for the selected MRAM bit cell row circuit 410(X)-410(Y) for the PUF read operation (block 610). The PUF read operation includes receiving a reference signal 544(0), 544(1) representing a resistance of the at least one reference MRAM bit cell 408(X)(R(0))-408(Y)(R(1)) in the at least one reference MRAM bit cell column circuit 412-R(0)-412-R(1) for the selected MRAM bit cell row circuit 410(X)-410(Y) for the PUF read operation (block 612). The PUF read operation also includes comparing the data signal 542(0)-542(N) to the reference signal 544(0), 544(1) (block 614). The PUF read operation also includes generating a PUF output 426(0)-426(N) based on the difference between the data signal 542(0)-542(N) and the reference signal 544(0), 544(1) (block 616).

Data write and read operations can also be performed in the MRAM data array 404 that are not PUF operations. In this regard, the write driver circuit 422 in the MRAM 400 in FIG. 5 is configured to generate the write signal 510 to program an MRAM bit cell 408(0)(0)-408(M)(N) in the MRAM bit cell column circuits 412(0)-412(N) to a memory state in response to a data write operation selecting an MRAM bit cell row circuit 410(0)-410(M) to be written in the MRAM data array 404. The reference write driver circuit 512 and second reference write driver circuit 522 can also generate a second reference write signal 520 and second reference write signal 530 to program a reference MRAM bit cell 408(0)(R(0))-408(M)(R(1)) in the MRAM bit cell column circuits 412-R(0), 412-R(1) to logic '0' and '1' reference memory states, respectively, in response to the data write operation selecting the MRAM bit cell row circuit 410(0)-410(M) to be written in the MRAM data array 404. Then, for a data read operation selecting an MRAM bit cell row circuit 410(0)-410(M) to be read, the memory access circuit 500 is configured to receive a data signals 542(0)-542(N) representing a resistance of the read MRAM bit cells 408(0)(0)-408(M)(N) in the MRAM bit cell column circuits 412(0)-412(N) for the selected MRAM bit cell row circuit 410(0)-410(M) for the data read operation. The memory access circuit 500 is also configured to receive a reference signal 544(0) and a reference signal 544(1) representing a resistances of the reference MRAM bit cells 408(0)(R(0))-408(M)(R(1)) in the reference MRAM bit cell column circuits 412-R(0), 412-R(1) for the selected MRAM bit cell row circuit 410(0)-410(M) for the data read operation. The memory access circuit 500 is configured to compare the data signals 542(0)-542(N) to the reference signals 544(0), 544

(1). For example, the memory access circuit 500 may average the reference signals 544(0), 544(1) into an average reference signal. The memory access circuit 500 is then configured to generate the data output 424(0)-424(N) based on the difference between the data signals 542(0)-542(N) and the reference signals 544(0), 544(1), such as an average of the reference signals 544(0), 544(1) for example.

In another example, a memory access circuit for controlling a PUF operation accessing MRAM bit cells in an MRAM array comprising an MRAM data array comprising at least one MRAM bit cell row circuit of data MRAM bit cells and an MRAM PUF array comprising at least one MRAM bit cell row circuit of PUF MRAM bit cells is provided. The memory access circuit comprises a means for generating a reference write signal to program at least one PUF MRAM bit cell in at least one MRAM bit cell column circuit to a reference memory state, in response to a PUF write operation selecting an MRAM bit cell row circuit to be written in the MRAM PUF array. For example, the means for generating a reference write signal to program at least one PUF MRAM bit cell in at least one MRAM bit cell column circuit to a reference memory state, in response to a PUF write operation selecting an MRAM bit cell row circuit to be written in the MRAM PUF array may be the write driver circuit 422 in the MRAM 400 in FIG. 5. The memory access circuit also comprises a means for generating a second reference write signal to program the at least one PUF MRAM bit cell in the at least one reference MRAM bit cell column circuit to the reference memory state, in response to the PUF write operation selecting the MRAM bit cell row circuit to be written in the MRAM PUF array. The means for generating a second reference write signal to program the at least one PUF MRAM bit cell in the at least one reference MRAM bit cell column circuit to the reference memory state, in response to the PUF write operation selecting the MRAM bit cell row circuit to be written in the MRAM PUF array may be the reference write driver circuit 512 and/or the second reference write driver circuit 522 in the MRAM 400 in FIG. 5. In response to a PUF read operation selecting an MRAM bit cell row circuit of PUF MRAM bit cells to be read, the memory access circuit also comprises a means for receiving a PUF data signal representing a resistance of the at least one PUF MRAM bit cell in the at least one MRAM bit cell column circuit for the selected MRAM bit cell row circuit for the PUF read operation, a means for receiving a reference signal representing a resistance of the at least one reference MRAM bit cell in the at least one reference MRAM bit cell column circuit for the selected MRAM bit cell row circuit for the PUF read operation, a means for comparing the PUF data signal to the reference signal, and a means for generating a PUF output based on a difference between the PUF data signal and the reference signal. For example, the means for receiving a PUF data signal representing a resistance of the at least one PUF MRAM bit cell in the at least one MRAM bit cell column circuit for the selected MRAM bit cell row circuit for the PUF read operation may be the memory access circuit 500 in the MRAM 400 in FIG. 5. The means for receiving a reference signal representing a resistance of the at least one reference MRAM bit cell in the at least one reference MRAM bit cell column circuit for the selected MRAM bit cell row circuit for the PUF read operation may also be the memory access circuit 500 in the MRAM 400 in FIG. 5. The means for comparing the PUF data signal to the reference signal may also be the memory access circuit 500 in the MRAM 400 in FIG. 5. The means for generating a PUF output based on a difference between the PUF data signal and the reference signal may also be the memory access circuit 500 in the MRAM 400 in FIG. 5.

A memory system that includes an MRAM array that includes a MRAM data array comprising data MRAM bit cells for supporting data memory operations in the memory system, and an integrated MRAM PUF array comprising PUF MRAM bit cells for supporting PUF operations, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
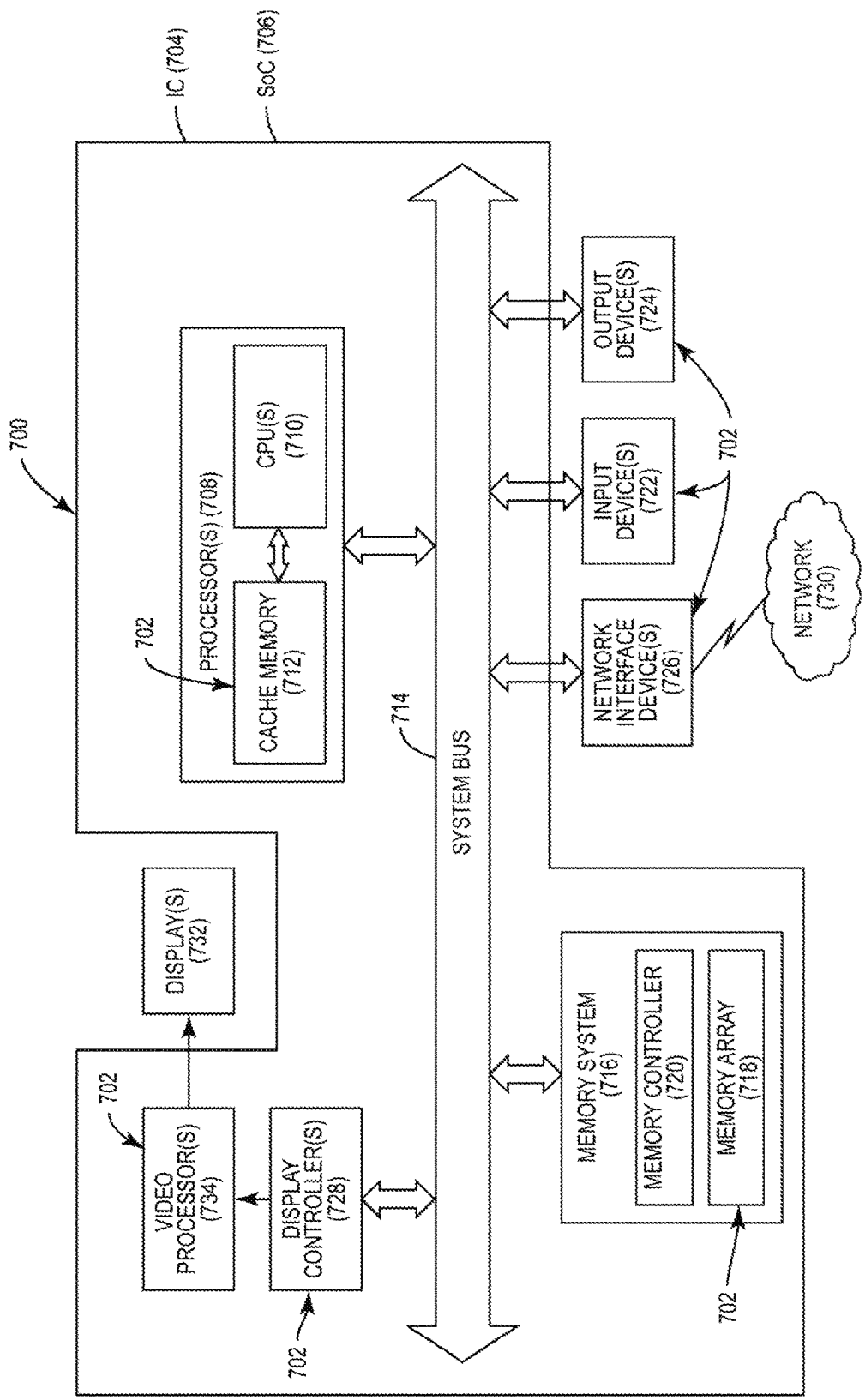
FIG. 7 is a block diagram of an exemplary processor-based system that includes one or more memory systems that include an MRAM array that includes a MRAM data array comprising data MRAM bit cells for supporting data memory operations in the memory system, an integrated MRAM PUF array comprising PUF MRAM bit cells for supporting PUF operations, including but not limited to the MRAM and/or MRAM array in FIGS. 4 and 5.

In this regard, FIG. 7 illustrates an example of a processor-based system 700 that can include one or more MRAMs that include an MRAM array 702 that includes a MRAM data array comprising data MRAM bit cells for supporting data memory operations in the memory system, an integrated MRAM PUF array comprising PUF MRAM bit cells for supporting PUF operations, and common access circuitry that can be used to access the data MRAM bit cells for data memory operations and the PUF MRAM bit cells for PUF operations. These MRAM systems and/or MRAM arrays include a MRAM data array comprising data MRAM bit cells for supporting data memory operations in the memory system, an integrated MRAM PUF array comprising PUF MRAM bit cells for supporting PUF operations, and common access circuitry that can be used to access the data MRAM bit cells for data memory operations and the PUF MRAM bit cells for PUF operations can include the MRAM 400 and/or MRAM array 402 in FIGS. 4 and 5, as non-limiting examples.

In this example, the processor-based system 700 is provided in an IC 704. The IC 704 may be included in or provided as a system-on-a-chip (SoC) 706. The processor-based system 700 includes a processor 708 that includes one or more CPUs 710. The processor 708 may include a cache memory 712 coupled to the CPU(s) 710 for rapid access to temporarily stored data. The cache memory 712 may include an MRAM array that includes a MRAM data array comprising data MRAM bit cells for supporting data memory operations in the memory system, an integrated MRAM PUF array comprising PUF MRAM bit cells for supporting PUF operations, and common access circuitry that can be used to access the data MRAM bit cells for data memory operations and the PUF MRAM bit cells for PUF operations can include the MRAM 400 and/or MRAM array 402 in FIGS. 4 and 5, respectively, as non-limiting examples. The processor 708 is coupled to a system bus 714 and can intercouple master and slave devices included in the processor-based system 700. As is well known, the processor 708 communicates with these other devices by exchanging address, control, and data information over the system bus 714. Although not illustrated in FIG. 7, multiple system buses 714 could be provided, wherein each system bus 714 constitutes a different fabric. For example, the processor 708 can communicate bus transaction requests to a memory system 716 as an example of a slave device. The memory system 716 may include a memory array 718 whose access is controlled by a memory controller 720. The memory system 716 may be an MRAM array that includes a MRAM data array comprising data MRAM bit cells for supporting data memory operations in the memory system, an integrated MRAM PUF array comprising PUF MRAM bit cells for supporting PUF operations, and common access circuitry that can be used to access the data MRAM bit cells for data memory operations and the PUF MRAM bit cells for PUF operations can include the MRAM 400 and/or MRAM array 402 in FIGS. 4 and 5, as non-limiting examples.

Other master and slave devices can be connected to the system bus 714. As illustrated in FIG. 7, these devices can include the memory system 716, and one or more input devices 722, which can include an MRAM array that includes a MRAM data array comprising data MRAM bit cells for supporting data memory operations in the memory system, an integrated MRAM PUF array comprising PUF MRAM bit cells for supporting PUF operations, and common access circuitry that can be used to access the data MRAM bit cells for data memory operations and the PUF MRAM bit cells for PUF operations can include the MRAM 400 and/or MRAM array 402 in FIGS. 4 and 5, as non-limiting examples. The input device(s) 722 can include any type of input device, including but not limited to input keys, switches, voice processors, etc. The other devices can also include one or more output devices 724, and one or more network interface devices 726, both of which can include an MRAM array that includes a MRAM data array comprising data MRAM bit cells for supporting data memory operations in the memory system, an integrated MRAM PUF array comprising PUF MRAM bit cells for supporting PUF operations, and common access circuitry that can be used to access the data MRAM bit cells for data memory operations and the PUF MRAM bit cells for PUF operations can include the MRAM 400 and/or MRAM array 402 in FIGS. 4 and 5, as non-limiting examples. The output device(s) 724 can include any type of output device, including but not limited to audio, video, other visual indicators, etc. The other devices can also include one or more display controllers 728 as examples. The network interface device(s) 726 can be any devices configured to allow exchange of data to and from a network 730. The network 730 can be any type of network, including but not limited to a wired or wireless network, a private or public network, a local area network (LAN), a wireless local area network (WLAN), a wide area network (WAN), a BLUETOOTH™ network, and the Internet. The network interface device(s) 726 can be configured to support any type of communications protocol desired.

The processor 708 may also be configured to access the display controller(s) 728 over the system bus 714 to control information sent to one or more displays 732. The display controller(s) 728 sends information to the display(s) 732 to be displayed via one or more video processors 734, which process the information to be displayed into a format suitable for the display(s) 732. The display controller(s) 728 and the video processor(s) 734 can include an MRAM array that includes a MRAM data array comprising data MRAM bit cells for supporting data memory operations in the memory system, an integrated MRAM PUF array comprising PUF MRAM bit cells for supporting PUF operations, and common access circuitry that can be used to access the data MRAM bit cells for data memory operations and the PUF MRAM bit cells for PUF operations can include the MRAM 400 and/or MRAM array 402 in FIGS. 4 and 5, as non-limiting examples. The display(s) 732 can include any type of display, including but not limited to a cathode ray tube (CRT), a liquid crystal display (LCD), a plasma display, etc.

Figure 8:
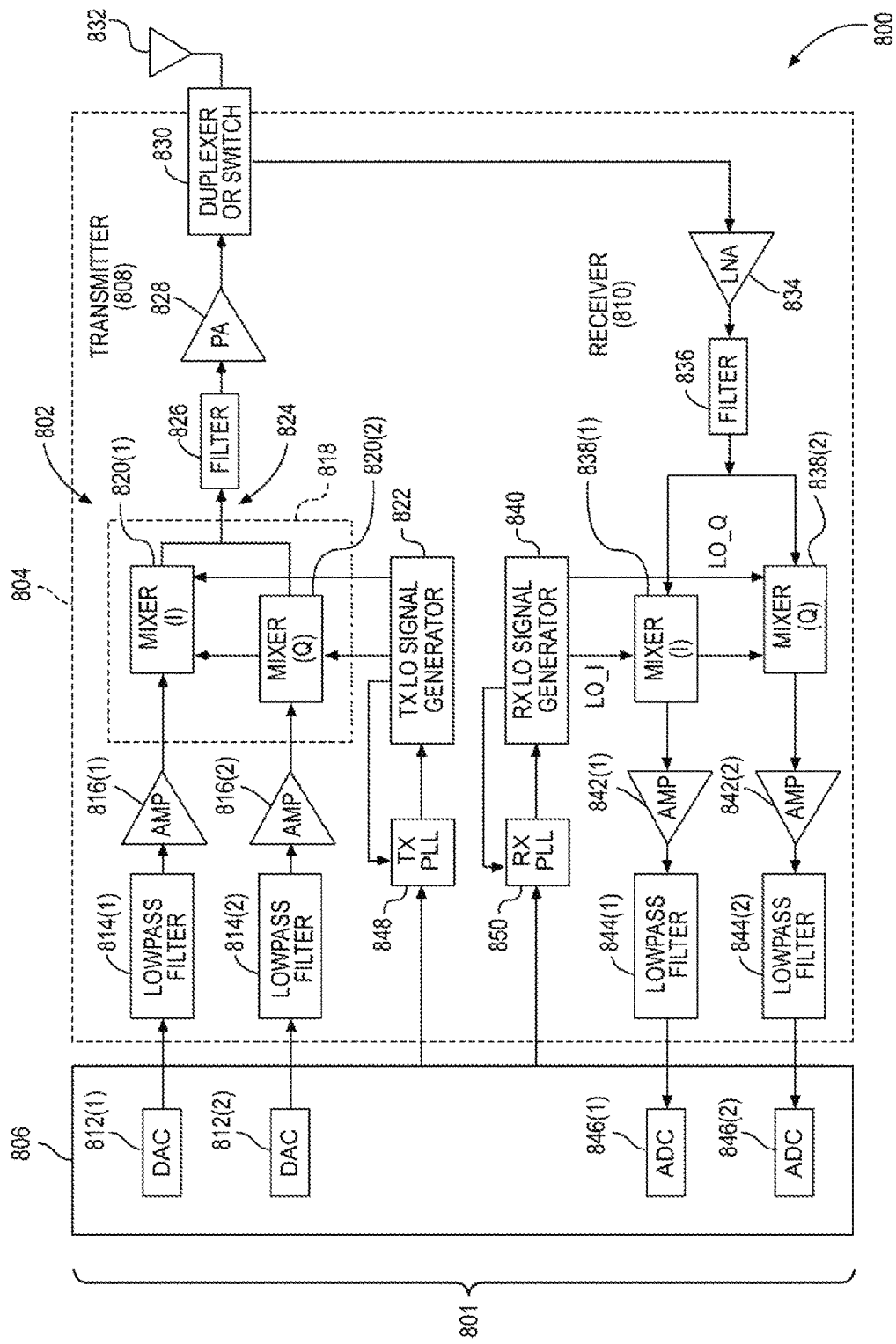
FIG. 8 is a block diagram of an exemplary wireless communications device that includes radio frequency (RF) components formed in an integrated circuit (IC), wherein any of the components therein can include a memory system that includes an MRAM array that includes a MRAM data array comprising data MRAM bit cells for supporting data memory operations in the memory system, an integrated MRAM PUF array comprising PUF MRAM bit cells for supporting PUF operations, including but not limited to the MRAM and/or MRAM array in FIGS. 4 and 5.

FIG. 8 illustrates an exemplary wireless communications device 800 that includes radio frequency (RF) components formed in an integrated circuit (IC) 802, wherein any of the components therein can include an MRAM array 801 that includes a MRAM data array comprising data MRAM bit cells for supporting data memory operations in the memory system, an integrated MRAM PUF array comprising PUF MRAM bit cells for supporting PUF operations, and common access circuitry that can be used to access the data MRAM bit cells for data memory operations and the PUF MRAM bit cells for PUF operations can include the MRAM 400 and/or MRAM array 402 in FIGS. 4 and 5, as non-limiting examples. In this regard, the wireless communications device 800 may be provided in the IC 802. The wireless communications device 800 may include or be provided in any of the above referenced devices, as examples. As shown in FIG. 8, the wireless communications device 800 includes a transceiver 804 and a data processor 806. The data processor 806 may include a memory to store data and program codes. The transceiver 804 includes a transmitter 808 and a receiver 810 that support bi-directional communications. In general, the wireless communications device 800 may include any number of transmitters 808 and/or receivers 810 for any number of communication systems and frequency bands. All or a portion of the transceiver 804 may be implemented on one or more analog ICs, RF ICs (RFICs), mixed-signal ICs, etc.

The transmitter 808 or the receiver 810 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 810. In the direct-conversion architecture, a signal is frequency-converted between RF and baseband in one stage. The super-heterodyne and direct-conversion architectures may use different circuit blocks and/or have different requirements. In the wireless communications device 800 in FIG. 8, the transmitter 808 and the receiver 810 are implemented with the direct-conversion architecture.

In the transmit path, the data processor 806 processes data to be transmitted and provides I and Q analog output signals to the transmitter 808. In the exemplary wireless communications device 800, the data processor 806 includes digital-to-analog converters (DACs) 812(1), 812(2) for converting digital signals generated by the data processor 806 into the I and Q analog output signals, e.g., I and Q output currents, for further processing.

Within the transmitter 808, lowpass filters 814(1), 814(2) filter the I and Q analog output signals, respectively, to remove undesired signals caused by the prior digital-to-analog conversion. Amplifiers (AMP) 816(1), 816(2) amplify the signals from the lowpass filters 814(1), 814(2), respectively, and provide I and Q baseband signals. An upconverter 818 upconverts the I and Q baseband signals with I and Q transmit (TX) local oscillator (LO) signals through mixers 820(1), 820(2) from a TX LO signal generator 822 to provide an upconverted signal 824. A filter 826 filters the upconverted signal 824 to remove undesired signals caused by the frequency upconversion as well as noise in a receive frequency band. A power amplifier (PA) 828 amplifies the upconverted signal 824 from the filter 826 to obtain the desired output power level and provides a transmit RF signal. The transmit RF signal is routed through a duplexer or switch 830 and transmitted via an antenna 832.

In the receive path, the antenna 832 receives signals transmitted by base stations and provides a received RF signal, which is routed through the duplexer or switch 830 and provided to a low noise amplifier (LNA) 834. The duplexer or switch 830 is designed to operate with a specific receive (RX)-to-TX duplexer frequency separation, such that RX signals are isolated from TX signals. The received RF signal is amplified by the LNA 834 and filtered by a filter 836 to obtain a desired RF input signal. Downconversion mixers 838(1), 838(2) mix the output of the filter 836 with I and Q RX LO signals (i.e., LO_I and LO_Q) from an RX LO signal generator 840 to generate I and Q baseband signals. The I and Q baseband signals are amplified by amplifiers (AMP) 842(1), 842(2) and further filtered by lowpass filters 844(1), 844(2) to obtain I and Q analog input signals, which are provided to the data processor 806. In this example, the data processor 806 includes ADCs 846(1), 846(2) for converting the analog input signals into digital signals to be further processed by the data processor 806.

In the wireless communications device 800 of FIG. 8, the TX LO signal generator 822 generates the I and Q TX LO signals used for frequency upconversion, while the RX LO signal generator 840 generates the I and Q RX LO signals used for frequency downconversion. Each LO signal is a periodic signal with a particular fundamental frequency. A TX phase-locked loop (PLL) circuit 848 receives timing information from the data processor 806 and generates a control signal used to adjust the frequency and/or phase of the TX LO signals from the TX LO signal generator 822. Similarly, an RX PLL circuit 850 receives timing information from the data processor 806 and generates a control signal used to adjust the frequency and/or phase of the RX LO signals from the RX LO signal generator 840.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory access circuit for controlling a physically unclonable function (PUF) operation accessing magneto-resistive magnetic random access memory (MRAM) bit cells in an MRAM array comprising an MRAM data array comprising at least one MRAM bit cell row circuit of data MRAM bit cells and an MRAM PUF array comprising at least one MRAM bit cell row circuit of PUF MRAM bit cells, the memory access circuit comprising:

a write driver circuit configured to generate a reference write signal to program at least one PUF MRAM bit cell in at least one MRAM bit cell column circuit to a reference memory state, in response to a PUF write operation selecting an MRAM bit cell row circuit to be written in the MRAM PUF array;

a reference write driver circuit configured to generate a second reference write signal to program at least one reference MRAM bit cell in at least one reference MRAM bit cell column circuit to the reference memory state, in response to the PUF write operation selecting the MRAM bit cell row circuit to be written in the MRAM PUF array;

a data output circuit configured to, in response to a PUF read operation selecting an MRAM bit cell row circuit of PUF MRAM bit cells to be read:
receive a PUF data signal representing a resistance of the at least one PUF MRAM bit cell in the at least one MRAM bit cell column circuit for the selected MRAM bit cell row circuit for the PUF read operation;
receive a reference signal representing a resistance of the at least one reference MRAM bit cell in the at least one reference MRAM bit cell column circuit for the selected MRAM bit cell row circuit for the PUF read operation;
compare the PUF data signal to the reference signal; and
generate a PUF output based on a difference between the PUF data signal and the reference signal.

2. The memory access circuit of claim 1, wherein the write driver circuit comprises a write driver data input, a PUF enable input, and a write driver output coupled to the at least one MRAM bit cell column circuit in the MRAM array;
the write driver circuit configured to generate the reference write signal on the write driver output based on a PUF write enable signal indicating a PUF write enable state on the PUF enable input, to program the at least one PUF MRAM bit cell in the at least one MRAM bit cell column circuit to the reference memory state, in response to the PUF write operation selecting the MRAM bit cell row circuit of the PUF MRAM bit cells to be written in the MRAM PUF array.

3. The memory access circuit of claim 1, wherein the reference write driver circuit comprises a reference PUF enable input and a reference write driver output coupled to at least one reference MRAM bit cell column circuit in the MRAM array;
the reference write driver circuit configured to generate the second reference write signal on the reference write driver output based on a PUF enable signal indicating a PUF write enable state on the reference PUF enable input, to program the at least one reference MRAM bit cell in the at least one reference MRAM bit cell column circuit to the reference memory state, in response to the PUF write operation selecting the MRAM bit cell row circuit to be written in the MRAM PUF array.

4. The memory access circuit of claim 1, wherein the data output circuit comprises at least one MRAM bit cell column input coupled to the at least one MRAM bit cell column circuit, at least one reference MRAM bit cell column input coupled to the at least one reference MRAM bit cell column circuit, and a data output;
wherein, in response to the PUF read operation selecting the MRAM bit cell row circuit of the PUF MRAM bit cells to be read, the data output circuit configured to:
receive the PUF data signal representing the resistance of the at least one PUF MRAM bit cell in the at least one MRAM bit cell column circuit for the selected MRAM bit cell row circuit for the PUF read operation on the at least one MRAM bit cell column input;
receive the reference signal representing a resistance of the at least one reference MRAM bit cell in the at least one reference MRAM bit cell column circuit for the selected MRAM bit cell row circuit for the PUF read operation on the at least one reference MRAM bit cell column input;
compare the PUF data signal to the reference signal; and
generate the PUF output on the data output based on the difference between the PUF data signal and the reference signal.

5. The memory access circuit of claim 1, wherein:
the write driver circuit is configured to generate the reference write signal to program a plurality of PUF MRAM bit cells each in an MRAM bit cell column circuit to the reference memory state, in response to the PUF write operation selecting the MRAM bit cell row circuit to be written in the MRAM PUF array; and
the data output circuit configured to, in response to the PUF read operation selecting the MRAM bit cell row circuit of the PUF MRAM bit cells to be read:
receive the PUF data signal representing a resistance of the plurality of PUF MRAM bit cells in a plurality of MRAM bit cell column circuits for the selected MRAM bit cell row circuit for the PUF read operation;
receive the reference signal representing the resistance of the at least one reference MRAM bit cell in the at least one reference MRAM bit cell column circuit for the selected MRAM bit cell row circuit for the PUF read operation;
compare the PUF data signal to the reference signal; and
generate the PUF output based on the difference between the PUF data signal and the reference signal.

6. The memory access circuit of claim 1, wherein:
the reference write driver circuit comprises:
a first reference write driver circuit configured to generate a first, second reference write signal to program a first reference MRAM bit cell in a first reference MRAM bit cell column circuit to the reference memory state, in response to the PUF write operation selecting the MRAM bit cell row circuit to be written in the MRAM PUF array; and
a second reference write driver circuit configured to generate a second, second reference write signal to program a second reference MRAM bit cell in a second reference MRAM bit cell column circuit to the reference memory state, in response to the PUF write operation selecting the MRAM bit cell row circuit to be written in the MRAM PUF array; and
the data output circuit configured to, in response to the PUF read operation selecting the MRAM bit cell row circuit of the PUF MRAM bit cells to be read:
receive a first reference signal representing a resistance of the first reference MRAM bit cell in the first reference MRAM bit cell column circuit, and a second reference signal representing a resistance of the second reference MRAM bit cell in the second reference MRAM bit cell column circuit for the selected MRAM bit cell row circuit for the PUF read operation;
average the first reference signal and the second reference signal to generate an average reference signal;
compare the PUF data signal to the average reference signal; and generate the PUF output based on a difference between the PUF data signal and the average reference signal.

7. The memory access circuit of claim 1, wherein:
the write driver circuit comprises a write driver data input, a PUF enable input, and a write driver output coupled to the at least one MRAM bit cell column circuit in the MRAM array;
the reference write driver circuit comprises a reference PUF enable input and a reference write driver output coupled to the at least one reference MRAM bit cell column circuit in the MRAM array; and
the data output circuit comprises at least one MRAM bit cell column input coupled to the at least one MRAM bit cell column circuit, at least one reference MRAM bit cell column input coupled to the at least one reference MRAM bit cell column circuit, and a data output;
wherein:
in response to the PUF write operation selecting the MRAM bit cell row circuit of the PUF MRAM bit cells to be written in the MRAM PUF array;
the write driver circuit is configured to generate the reference write signal on the write driver output based on a PUF write enable signal indicating a PUF write enable state on the PUF enable input, to program the at least one PUF MRAM bit cell in the at least one MRAM bit cell column circuit to the reference memory state; and
the reference write driver circuit is configured to generate the second reference write signal on the reference write driver output based on the PUF write enable signal indicating the PUF write enable state on the reference PUF enable input, to program the at least one reference MRAM bit cell in the at least one reference MRAM bit cell column circuit to the reference memory state; and
in response to the PUF read operation selecting the MRAM bit cell row circuit of the PUF MRAM bit cells to be read, the data output circuit is configured to:
receive the PUF data signal representing the resistance of the at least one PUF MRAM bit cell in the at least one MRAM bit cell column circuit for the selected MRAM bit cell row circuit for the PUF read operation on the at least one MRAM bit cell column input;
receive the reference signal representing the resistance of the at least one reference MRAM bit cell in the at least one reference MRAM bit cell column circuit for the selected MRAM bit cell row circuit for the PUF read operation on the at least one reference MRAM bit cell column input;
compare the PUF data signal to the reference signal; and
generate the PUF output on the data output based on the difference between the PUF data signal and the reference signal.

8. The memory access circuit of claim 1 integrated into an integrated circuit (IC).

9. The memory access circuit of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A memory access circuit for controlling a physically unclonable function (PUF) operation accessing magneto-resistive random access memory (MRAM) bit cells in an MRAM array comprising an MRAM data array comprising at least one MRAM bit cell row circuit of data MRAM bit cells and an MRAM PUF array comprising at least one MRAM bit cell row circuit of PUF MRAM bit cells, the memory access circuit comprising:
a means for generating a reference write signal to program at least one PUF MRAM bit cell in at least one MRAM bit cell column circuit to a reference memory state, in response to a PUF write operation selecting an MRAM bit cell row circuit to be written in the MRAM PUF array; and
a means for generating a second reference write signal to program at least one reference MRAM bit cell in at least one reference MRAM bit cell column circuit to the reference memory state, in response to the PUF write operation selecting the MRAM bit cell row circuit to be written in the MRAM PUF array; and
in response to a PUF read operation selecting an MRAM bit cell row circuit of PUF MRAM bit cells to be read:
a means for receiving a PUF data signal representing a resistance of the at least one PUF MRAM bit cell in the at least one MRAM bit cell column circuit for the selected MRAM bit cell row circuit for the PUF read operation;
a means for receiving a reference signal representing a resistance of the at least one reference MRAM bit cell in the at least one reference MRAM bit cell column circuit for the selected MRAM bit cell row circuit for the PUF read operation;
a means for comparing the PUF data signal to the reference signal; and
a means for generating a PUF output based on a difference between the PUF data signal and the reference signal.

11. A method of controlling access to at least one magneto-resistive random access memory (MRAM) bit cell in an MRAM array in an MRAM for performing a physically unclonable function (PUF) operation, the MRAM array comprising a plurality of MRAM bit cell row circuits each comprising a plurality of MRAM bit cells, and a plurality of MRAM bit cell column circuits each comprising an MRAM bit cell from an MRAM bit cell row circuit among the plurality of MRAM bit cell row circuits, the method comprising:
in response to a PUF write operation selecting an MRAM bit cell row circuit of PUF MRAM bit cells to be written in an MRAM PUF array, the MRAM PUF array comprising one or more MRAM bit cell row circuits among the plurality of MRAM bit cell row circuits in the MRAM array, wherein the PUF MRAM bit cells in the MRAM PUF array comprise a plurality of PUF MRAM bit cells:
generating a reference write signal to program at least one PUF MRAM bit cell in at least one MRAM bit cell column circuit to a reference memory state; and
generating a second reference write signal to program at least one reference MRAM bit cell in at least one reference MRAM bit cell column circuit to the reference memory state; and in response to a PUF read operation selecting an MRAM bit cell row circuit of PUF MRAM bit cells to be read:
receiving a PUF data signal representing a resistance of the at least one PUF MRAM bit cell in the at least one MRAM bit cell column circuit for the selected MRAM bit cell row circuit for the PUF read operation;
receiving a reference signal representing a resistance of the at least one reference MRAM bit cell in the at least one reference MRAM bit cell column circuit for the selected MRAM bit cell row circuit for the PUF read operation;
comparing the PUF data signal to the reference signal; and
generating a PUF output based on a difference between the PUF data signal and the reference signal.

12. The method of claim 11, wherein:
generating the reference write signal comprises generating the reference write signal to program the plurality of PUF MRAM bit cells each in an MRAM bit cell column circuit to the reference memory state; and
receiving the PUF data signal comprises receiving the PUF data signal representing a resistance of the plurality of PUF MRAM bit cells in the plurality of MRAM bit cell column circuits for the selected MRAM bit cell row circuit for the PUF read operation.

13. The method of claim 11, wherein:
generating a first reference write signal comprises:
generating a first, second reference write signal to program a first reference MRAM bit cell in a first reference MRAM bit cell column circuit; and
generating a second, second reference write signal to program a second reference MRAM bit cell in a second reference MRAM bit cell column circuit; and
receiving the reference signal comprises:
receiving a first reference signal representing a resistance of the first reference MRAM bit cell in the first reference MRAM bit cell column circuit; and
receiving a second reference signal representing a resistance of the second reference MRAM bit cell in the second reference MRAM bit cell column circuit for the selected MRAM bit cell row circuit for the PUF read operation;
further comprising averaging the first reference signal and the second reference signal to generate an average reference signal; and
wherein:
comparing the PUF data signal comprises comparing the PUF data signal to the average reference signal; and
generating the PUF output comprises generating the PUF output based on a difference between the PUF data signal and the average reference signal.

14. The method of claim 11, further comprising:
in response to a data write operation selecting an MRAM bit cell row circuit to be written in an MRAM data array comprising one or more MRAM bit cell row circuits among the plurality of MRAM bit cell row circuits in the MRAM array, wherein MRAM bit cells in the MRAM data array comprise a plurality of data MRAM bit cells:
generating a write signal to program at least one data MRAM bit cell in the at least one MRAM bit cell column circuit to a memory state, in response to a data write operation selecting an MRAM bit cell row circuit to be written in the MRAM data array; and
generating a reference write signal to program the at least one reference MRAM bit cell in the at least one reference MRAM bit cell column circuit to the reference memory state, in response to the data write operation selecting the MRAM bit cell row circuit to be written in the MRAM data array; and in response to a data read operation selecting an MRAM bit cell row circuit to be read:
receiving a data signal representing a resistance of the at least one data MRAM bit cell in the at least one MRAM bit cell column circuit for the selected MRAM bit cell row circuit for the data read operation;
receiving a data reference signal representing a resistance of the at least one reference MRAM bit cell in the at least one reference MRAM bit cell column circuit for the selected MRAM bit cell row circuit for the data read operation;
comparing the data signal to the data reference signal; and
generating a data output based on a difference between the data signal and the reference signal.

15. A magneto-resistive random access memory (MRAM), comprising:
an MRAM array, comprising:
a plurality of MRAM bit cell row circuits each comprising a plurality of MRAM bit cells; and
a plurality of MRAM bit cell column circuits each comprising an MRAM bit cell from an MRAM bit cell row circuit among the plurality of MRAM bit cell row circuits;
an MRAM data array comprising one or more MRAM bit cell row circuits among the plurality of MRAM bit cell row circuits in the MRAM array, wherein the MRAM bit cells in the MRAM data array comprise a plurality of data MRAM bit cells; and
an MRAM physically unclonable function (PUF) array comprising one or more MRAM bit cell row circuits among the plurality of MRAM bit cell row circuits in the MRAM array not included in the MRAM data array, wherein MRAM bit cells in the MRAM PUF array comprise a plurality of PUF MRAM bit cells; and
a memory access circuit, comprising:
a write driver circuit coupled to the MRAM array, the write driver circuit configured to generate a reference write signal to program at least one PUF MRAM bit cell in at least one MRAM bit cell column circuit to a reference memory state, in response to a PUF write operation selecting the MRAM bit cell row circuit to be written in the MRAM PUF array;
a reference write driver circuit configured to generate a second reference write signal to program at least one reference MRAM bit cell in at least one reference MRAM bit cell column circuit to the reference memory state, in response to the PUF write operation selecting the MRAM bit cell row circuit to be written in the MRAM PUF array; and
a data output circuit configured to, in response to a PUF read operation selecting an MRAM bit cell row circuit to be read:
receive a PUF data signal representing a resistance of the at least one PUF MRAM bit cell in the at least one MRAM bit cell column circuit for the selected MRAM bit cell row circuit for the PUF read operation;

receive a reference signal representing a resistance of the at least one reference MRAM bit cell in the at least one reference MRAM bit cell column circuit for the selected MRAM bit cell row circuit for the PUF read operation;

compare the PUF data signal to the reference signal; and generate a PUF output based on a difference between the PUF data signal and the reference signal.

16. The MRAM of claim 15, wherein:

the write driver circuit is further configured to generate a write signal to program a data MRAM bit cell in at least one MRAM bit cell column circuit to a memory state, in response to a data write operation selecting an MRAM bit cell row circuit to be written in the MRAM data array;

the reference write driver circuit is further configured to generate a reference write signal to program at least one reference MRAM bit cell in the at least one reference MRAM bit cell column circuit to a reference memory state, in response to the data write operation selecting the MRAM bit cell row circuit to be written in the MRAM data array; and the data output circuit further configured to, in response to a data read operation selecting an MRAM bit cell row circuit to be read:

receive a data signal representing a resistance of the at least one data MRAM bit cell in the at least one MRAM bit cell column circuit for the selected MRAM bit cell row circuit for the data read operation;

receive a data reference signal representing a resistance of the at least one reference MRAM bit cell in the at least one reference MRAM bit cell column circuit for the selected MRAM bit cell row circuit for the data read operation;

compare the data signal to the data reference signal; and generate a data output based on a difference between the data signal and the reference signal.

17. The MRAM of claim 15, wherein:

the write driver circuit is configured to generate the reference write signal to program a plurality of PUF MRAM bit cells each in an MRAM bit cell column circuit to the reference memory state, in response to the PUF write operation selecting the MRAM bit cell row circuit to be written in the MRAM PUF array;

the data output circuit configured to, in response to the PUF read operation selecting the MRAM bit cell row circuit of PUF MRAM bit cells to be read:

receive the PUF data signal representing the resistance of the plurality of PUF MRAM bit cells in the plurality of MRAM bit cell column circuits for the selected MRAM bit cell row circuit for the PUF read operation;

receive the reference signal representing the resistance of the at least one reference MRAM bit cell in the at least one reference MRAM bit cell column circuit for the selected MRAM bit cell row circuit for the PUF read operation;

compare the PUF data signal to the reference signal; and generate the PUF output based on the difference between the PUF data signal and the reference signal.

18. The MRAM of claim 15, further comprising a plurality of read/write selector circuits, each read/write selector circuit among the plurality of read/write selector circuits coupled to an MRAM bit cell column circuit among the plurality of MRAM bit cell column circuits;

the memory access circuit coupled to the plurality of read/write selector circuits; and wherein:

the write driver circuit is configured to generate the reference write signal to at least one read/write selector circuit among the plurality of read/write selector circuits coupled to the at least one MRAM bit cell column circuit to program the at least one PUF MRAM bit cell in the at least one MRAM bit cell column circuit to the reference memory state, in response to the PUF write operation selecting the MRAM bit cell row circuit to be written in the MRAM PUF array;

the reference write driver circuit is configured to generate the second reference write signal to the at least one read/write selector circuit among the plurality of read/write selector circuits coupled to the at least one reference MRAM bit cell column circuit to program the at least one reference MRAM bit cell in the at least one reference MRAM bit cell column circuit to the reference memory state, in response to the PUF write operation selecting the MRAM bit cell row circuit to be written in the MRAM PUF array; and the data output circuit is configured to, in response to the PUF read operation selecting the MRAM bit cell row circuit to be read:

receive the PUF data signal from the at least one read/write selector circuit among the plurality of read/write selector circuits coupled to the at least one MRAM bit cell column circuit representing the resistance of the at least one PUF MRAM bit cell in the at least one MRAM bit cell column circuit for the selected MRAM bit cell row circuit for the PUF read operation;

receive the reference signal from the at least one read/write selector circuit among the plurality of read/write selector circuits coupled to the at least one reference MRAM bit cell column circuit representing the resistance of the at least one reference MRAM bit cell in the at least one reference MRAM bit cell column circuit for the selected MRAM bit cell row circuit for the PUF read operation;

compare the PUF data signal to the reference signal; and generate the PUF output based on the difference between the PUF data signal and the reference signal.

19. The MRAM of claim 15, wherein each MRAM bit cell row circuit among the plurality of MRAM bit cell row circuits comprises:

a magnetic tunnel junction (MTJ) coupled to a bit line; and an access transistor coupled the MTJ, the access transistor comprising a gate coupled to a word line, and a source coupled to a source line.

20. The MRAM of claim 15 integrated into an integrated circuit (IC).

21. The MRAM of claim 15 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

* * * * *